(12) United States Patent
Taha et al.

(10) Patent No.: US 12,362,701 B2
(45) Date of Patent: Jul. 15, 2025

(54) METHODS AND DEVICES FOR ADAPTING A SOLAR MODULE SUPPORT

(71) Applicant: NEVADOS ENGINEERING, INC., San Francisco, CA (US)

(72) Inventors: Yezin Taha, San Francisco, CA (US); Amitoj Gill, Roseville, CA (US); Laura Sverchek, San Francisco, CA (US)

(73) Assignee: Nevados Engineering, Inc., Oakland, CA (US)

( * ) Notice: Subject to any disclaimer, the term of this patent is extended or adjusted under 35 U.S.C. 154(b) by 0 days.

(21) Appl. No.: 18/207,533

(22) Filed: Jun. 8, 2023

(65) Prior Publication Data

US 2023/0402960 A1 Dec. 14, 2023

Related U.S. Application Data

(60) Provisional application No. 63/351,113, filed on Jun. 10, 2022.

(51) Int. Cl.
*H02S 20/32* (2014.01)
(52) U.S. Cl.
CPC .................................. *H02S 20/32* (2014.12)
(58) Field of Classification Search
None
See application file for complete search history.

(56) References Cited

U.S. PATENT DOCUMENTS

| | | | |
|---|---|---|---|
| 2011/0204193 A1* | 8/2011 | Sagayama | F24S 25/10 248/176.1 |
| 2011/0265860 A1 | 11/2011 | Ciasulli et al. | |
| 2014/0246549 A1* | 9/2014 | West | H02S 20/23 248/220.22 |
| 2017/0250648 A1* | 8/2017 | Haas | F24S 25/65 |
| 2017/0294870 A1 | 10/2017 | Almy et al. | |
| 2018/0062567 A1 | 3/2018 | Oh et al. | |
| 2020/0088446 A1 | 3/2020 | Dally | |
| 2020/0153382 A1 | 5/2020 | Ballentine et al. | |

FOREIGN PATENT DOCUMENTS

| | | | | |
|---|---|---|---|---|
| ES | 2423155 B1 * | 2/2014 | | F24J 2/5211 |
| WO | 2019/043612 A1 | 3/2019 | | |

OTHER PUBLICATIONS

Machine translation of ES2423155B1 (Year: 2014).*
(Continued)

*Primary Examiner* — Ryan S Cannon
(74) *Attorney, Agent, or Firm* — Schmidt Patent Law, Inc.

(57) ABSTRACT

Included are methods and devices of adapting a solar module support with pre-formed features that position and/or secure solar module clips. The adaptation may include forming new positioning and/securing features at new locations on the solar module support, or otherwise positioning the solar module clips on the solar module support at locations different from these pre-formed features. These methods and devices allow a solar module support with pre-formed features to accommodate solar modules of different dimensions than originally envisioned.

19 Claims, 36 Drawing Sheets

(56) References Cited

OTHER PUBLICATIONS

From the European Patent Office as the ISA, Notification of the International Search Report and Written Opinion of the International Search Authority, or the Declaration, PCT/US2023/024844, Nov. 9, 2023, 18 pages.
From the European Patent Office as the ISA, Annex to Form PCT/ISA/206, Communication Relating to the Results of the Partial International Search, PCT/US2023/024844, Sep. 19, 2023, 2 pages.

* cited by examiner

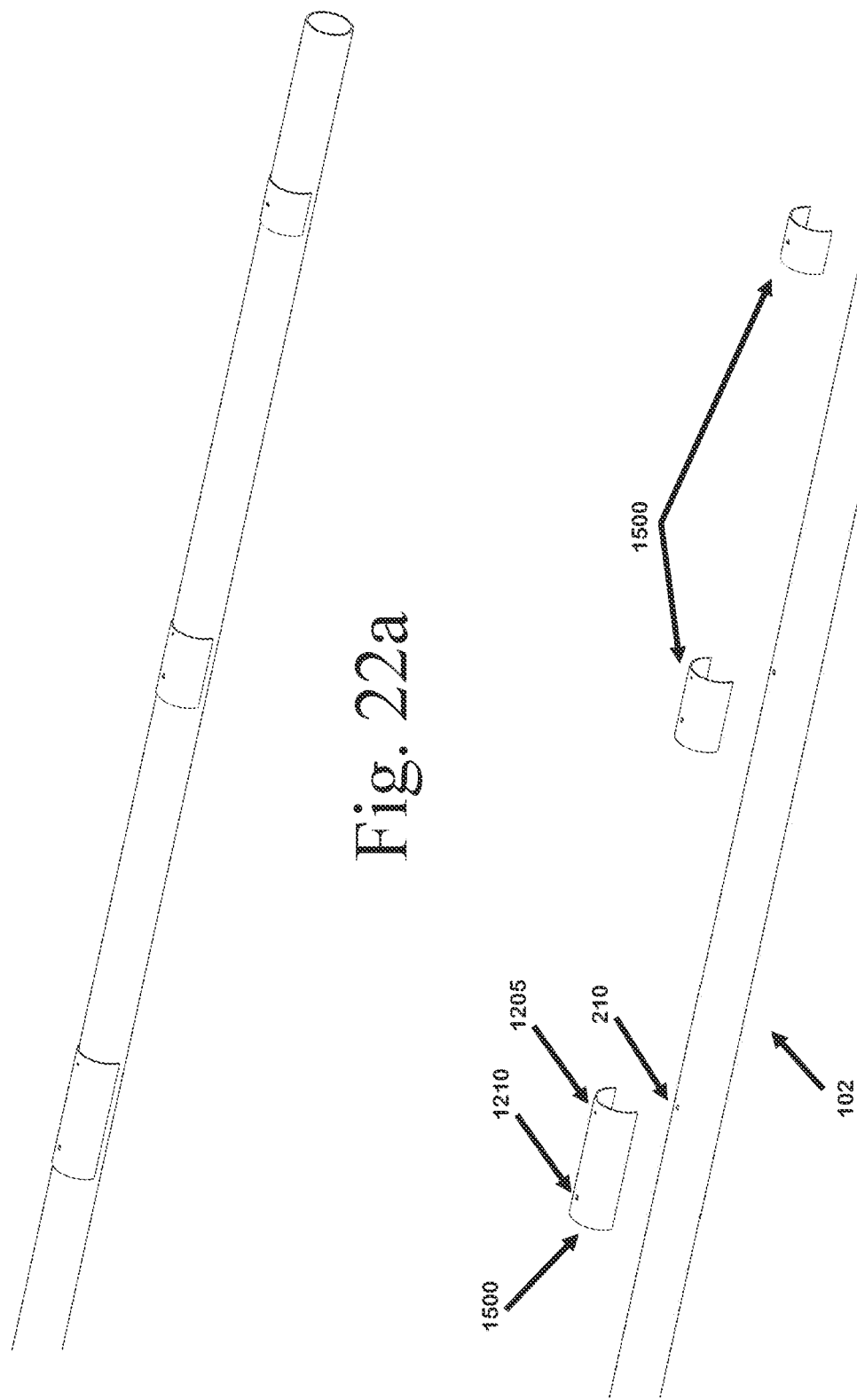

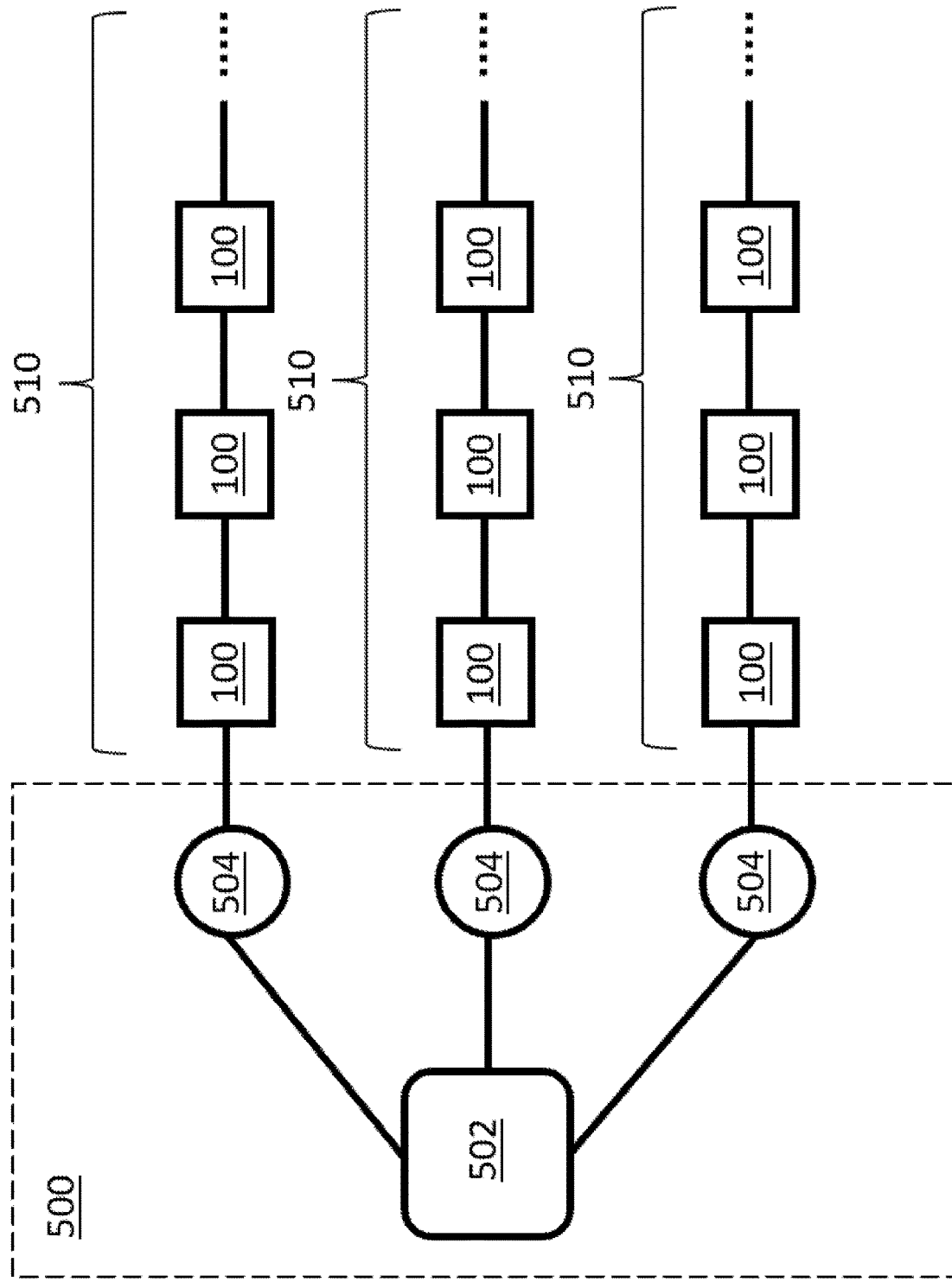

METHODS AND DEVICES FOR ADAPTING A SOLAR MODULE SUPPORT

CROSS REFERENCE TO RELATED APPLICATIONS

The application claims priority to U.S. Provisional Patent Application 63/351,113 titled "METHODS AND DEVICES FOR ADAPTING A SOLAR MODULE SUPPORT" filed on Jun. 10, 2022, which application is incorporated herein by reference in its entirety.

FIELD OF THE INVENTION

The invention relates generally to solar trackers, specifically locating and relocating module placement on solar trackers.

BACKGROUND

Two types of mounting systems are widely used for mounting solar panels. Fixed tilt mounting structures support solar panels in a fixed position. The efficiency with which panels supported in this manner generate electricity can vary significantly during the course of a day, as the sun moves across the sky and illuminates the fixed panels more or less effectively. However, fixed tilt solar panel mounting structures may be mechanically simple and inexpensive, and in ground-mounted installations may be arranged relatively easily on sloped and/or uneven terrain.

Single axis tracker solar panel mounting structures allow rotation of the panels about an axis to partially track the motion of the sun across the sky. For example, a single axis tracker may be arranged with its rotation axis oriented generally North-South, so that rotation of the panels around the axis can track the East-West component of the sun's daily motion. Alternatively, a single axis tracker may be arranged with its rotation axis oriented generally East-West, so that rotation of the panels around the axis can track the North-South component of the sun's daily (and seasonal) motion. Solar panels supported by single axis trackers can generate significantly more power than comparable panels arranged in a fixed position.

The solar panels themselves may be disposed on solar panel supports such as torque tubes. The solar panels need to be appropriately located on certain positions in the torque tube.

Installing multiple solar panels in a large array can be a time-consuming process complicated by the difficulty of aligning each solar panel for optimum efficiency, as well as the manufacturing capabilities needed to produce solar panel securing devices that can accommodate all of the various dimensions and orientations of solar panels. Conventional single-axis trackers often comprise long lengths of steel that must be connected to form the strongback that the solar modules are mounted on. After the torque tubes are aligned, the solar panels must be mounted on top of them. A conventional solar module clip may extend lengthwise in the East-West direction. It may have a North side, a South side, and a top side connecting the North side with the South side ("side" may also refer to a "face" of the component). The North and South side would be the same size, and the top side would be completely flat, without any markers that serve to aid alignment on the torque tube. Because they lack any alignment aids, it is a difficult and time-consuming process to manually align a solar panel on a conventional solar module clip in the East-West direction.

Many solar module manufacturers provide mounting features such as holes on torque tubes. A solar module clip is clipped into these mounting holes, which serve the dual purpose of positioning the solar module clip onto the torque tube as well as securing the module clip to the torque tube. Then the solar modules secured to these clips. The mounting holes are spaced a predetermined distance apart based on the predetermined dimensions of the solar modules. This setup allows a quick way of spacing solar modules apart from each other with minimal manual measurement and adjustment.

However, changing technology or other considerations may mean that the dimensions of available solar modules may change over time. Since many of the torque tubes that are manufactured are pre-drilled with holes and features accommodating specific dimensions of solar modules, these torque tubes would not be usable with solar modules of differing dimensions.

Consequently, there is a need to relocate positioning features or otherwise adapt torque tubes so that solar modules of differing dimensions may be properly and easily spaced apart from each other upon these torque tubes.

SUMMARY

Embodiments of this invention include methods and devices of adapting a solar module support with pre-formed features that position and/or secure solar module clips. The adaptation may comprise forming new positioning and/or securing features at new locations on the solar module support, or otherwise positioning the solar module clips on the solar module support at locations different from these pre-formed features.

The adaptation can comprise a continuous adapter secured to the solar module support, segmented adapters secured to the solar module support, a rollable adapter unrolled onto the solar module support, a removable jig positioning new positions of the module clips, among other embodiments.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

FIGS. 22a-d show segmented adapters spaced out from each other on a torque tube to relocate holes on the torque tube.

FIG. 32 shows a block diagram of a solar panel control system in communication with a solar panel array.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention.

As used in this specification and the appended claims, the singular forms "a," "an," and "the" include plural referents unless the context clearly indicates otherwise. Also, the term "parallel" is intended to mean "substantially parallel" and to encompass minor deviations from parallel geometries. The term "vertical" refers to a direction parallel to the force of the earth's gravity. The term "horizontal" refers to a direction perpendicular to "vertical".

Figure 28:
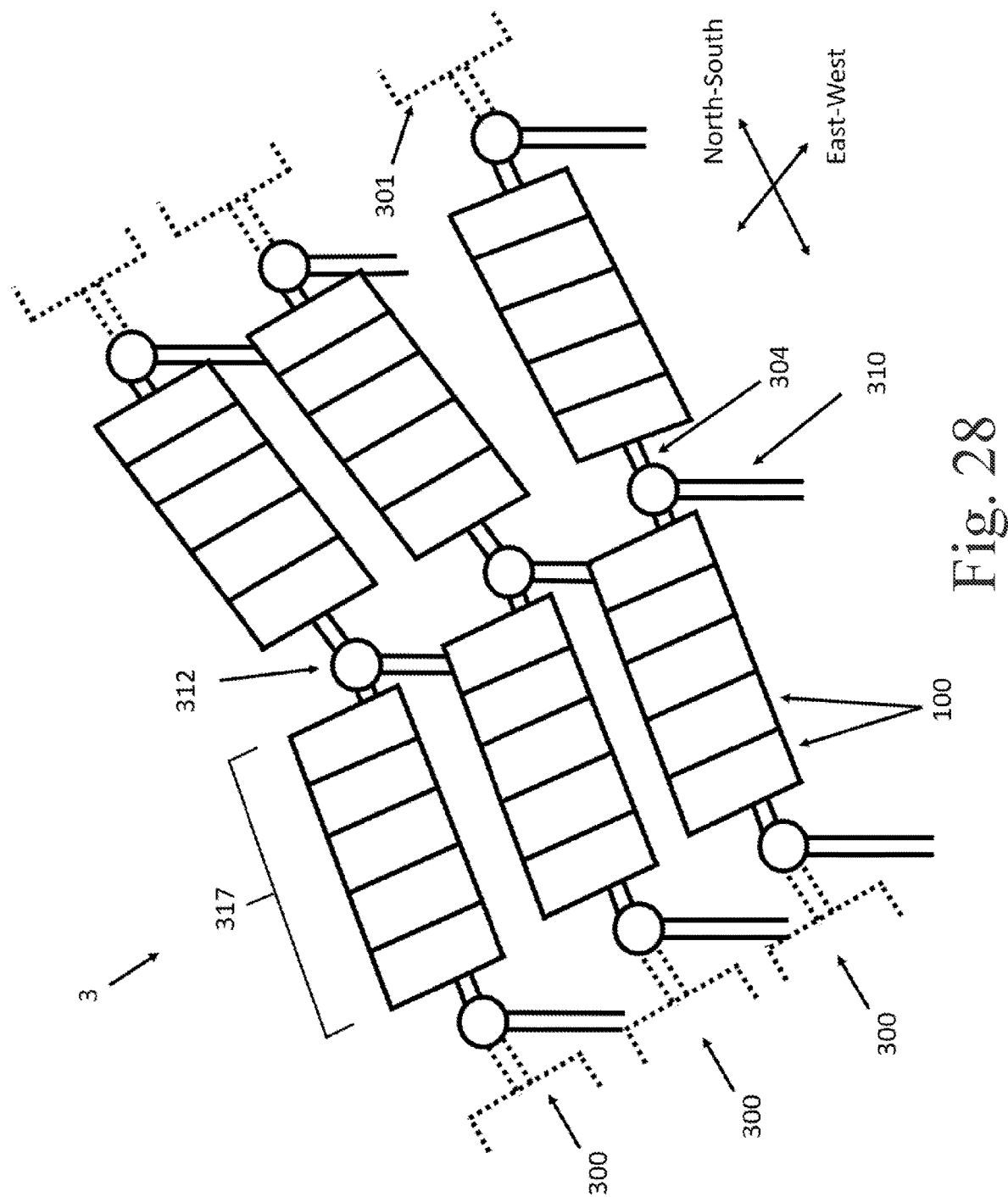
FIG. 28 shows a perspective view of a solar site array with three trackers and at least two bays of solar modules each.
Figure 29:
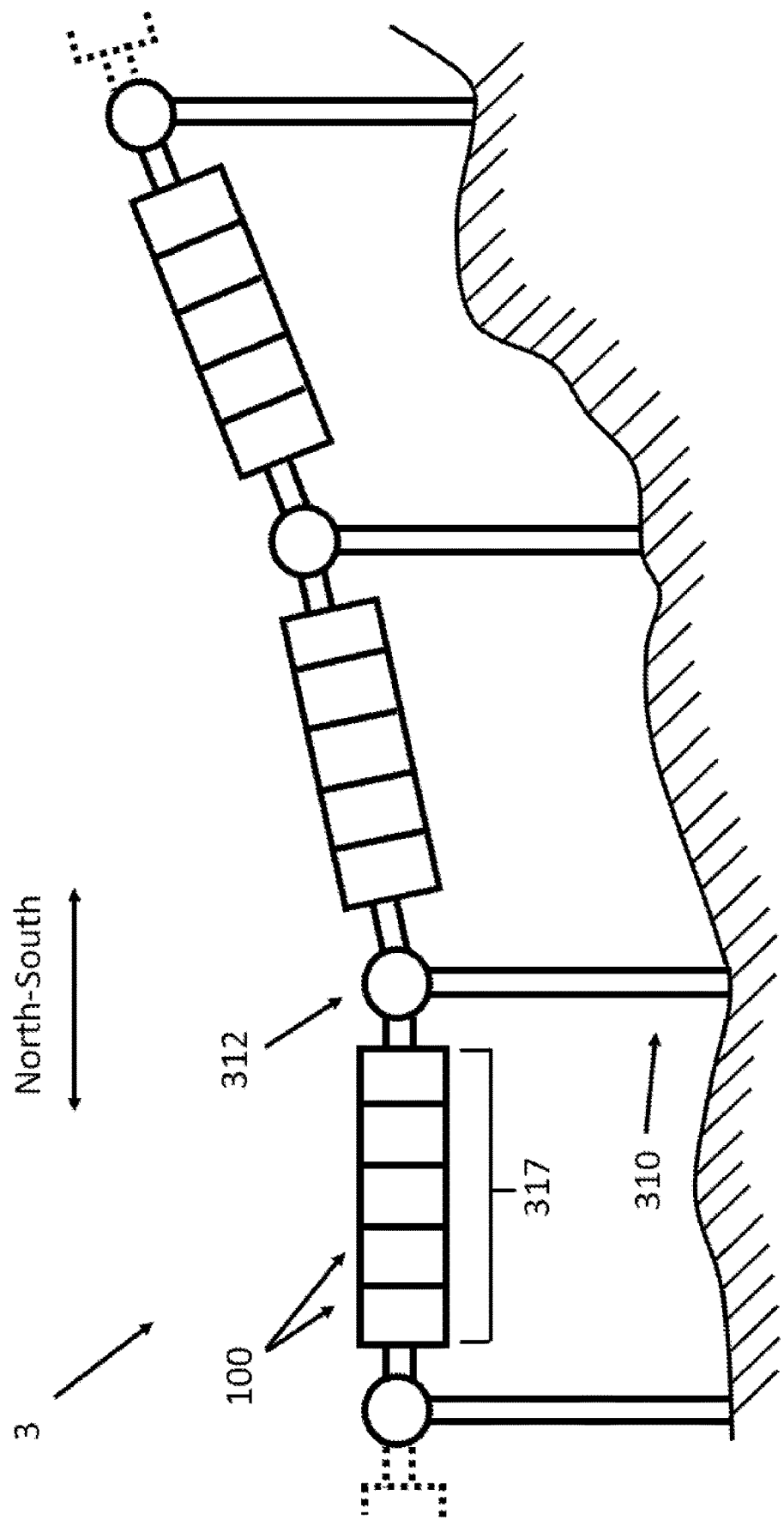
FIG. 29 shows a cross section of a single tracker with three bays of solar modules on an upward slope extending along the North-South axis.
Figure 30:
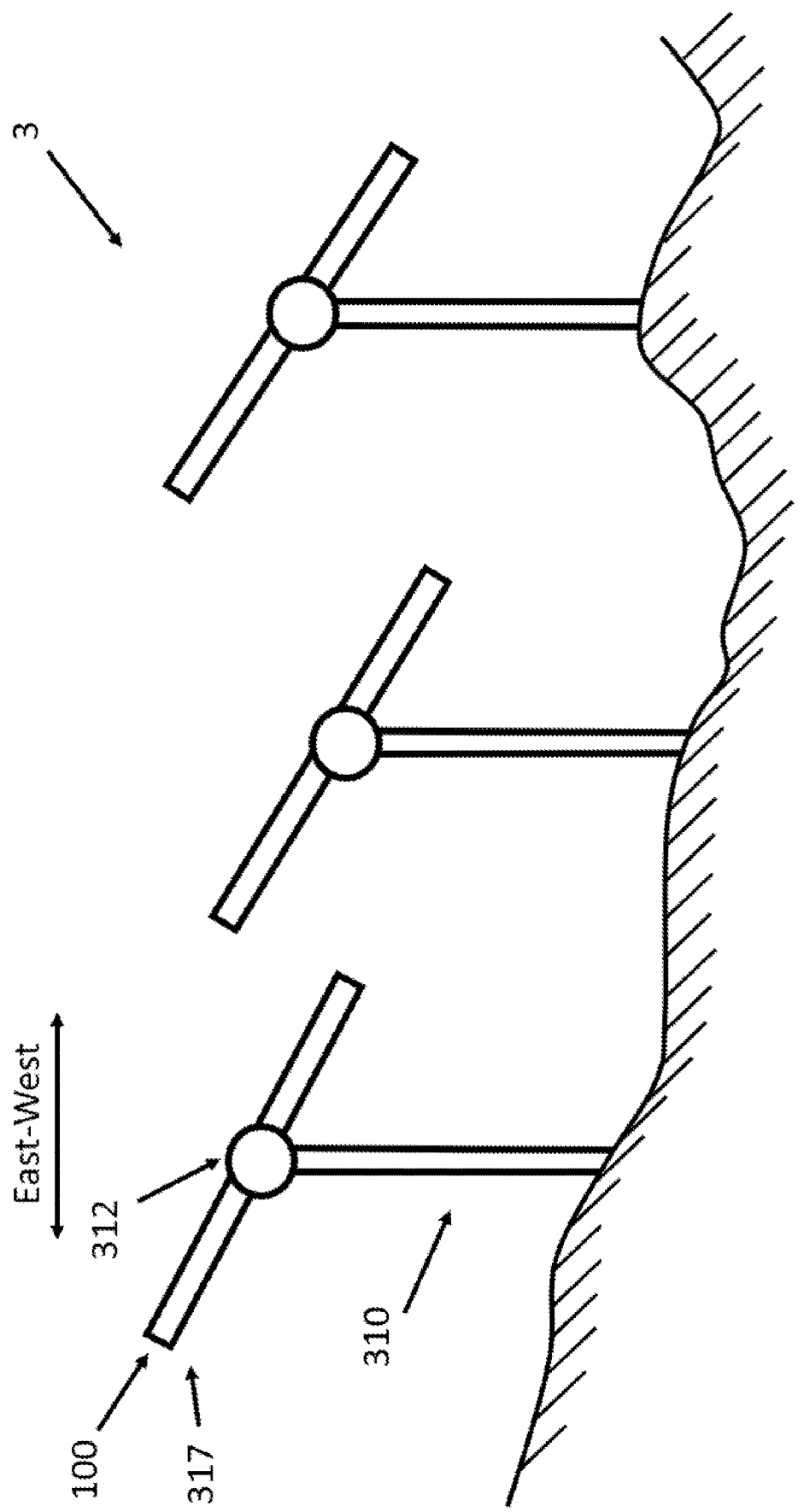
FIG. 30 shows a cross section of a solar site array with three trackers neighboring each other along the East-West axis.

FIGS. 28-30 illustrate a solar array site including multiple trackers. FIG. 28 depicts three trackers in the solar site array directly adjacent to each other, each running along or approximately along the north-south direction with solar modules extending lengthwise in or approximately in the east-west direction. Alternatively, the trackers may run along or approximately along the east-west direction with solar modules extending lengthwise in or approximately in the north-south direction, or any other desired orientation. An angle change is depicted in all three trackers at the bearing assembly 312. The rightmost tracker on the page illustrates that a tracker or a bay 317 in a tracker may a different angle with relationship to the North-South axis than its neighbor (s). Bearing assemblies 312 disposed on a support post 310 could be any of the bearing assemblies described below, such as an articulating bearing assembly. A bay 317 includes a series of solar modules disposed directly adjacent to each other. The bay 317 may be bounded by bearing assemblies and disposed on a single solar panel support 304 (e.g., a torque tube). A single bay 317 may have solar panel modules 301 that have parallel normal vectors and also lie on a same plane as each other, which holds true even as the torque tube rotates the solar modules. The bays 317 in a single tracker and/or across different trackers may have the same number of solar panel modules 301 or different number of solar panel modules 301 as each other, such as from 1 to 20 solar modules, such as from 3 to 15, such as from 5 to 10. The dashed lines at the "ends" of the trackers indicate that there may be more solar panel support 304 and solar panel modules 301 extending in one or either direction, such as more bays. FIG. 29 depicts a cross section of a solar array site looking along the east-west axis, depicting a single tracker with at least three bays 317 for ease of understanding. FIG. 30 depicts a cross section of a solar site array looking along the north-south axis. Three trackers of the solar site array are depicted side by side on the sloped landscape. The solar panel modules 301 in the bays 317 are tilted away from the horizontal. For ease of understanding, only one bay 317 in each of the three trackers is depicted, although in a physical site other bays further down the tracker may be visible from this perspective due to angle changes at the bearing assemblies 312.

Figure 31:
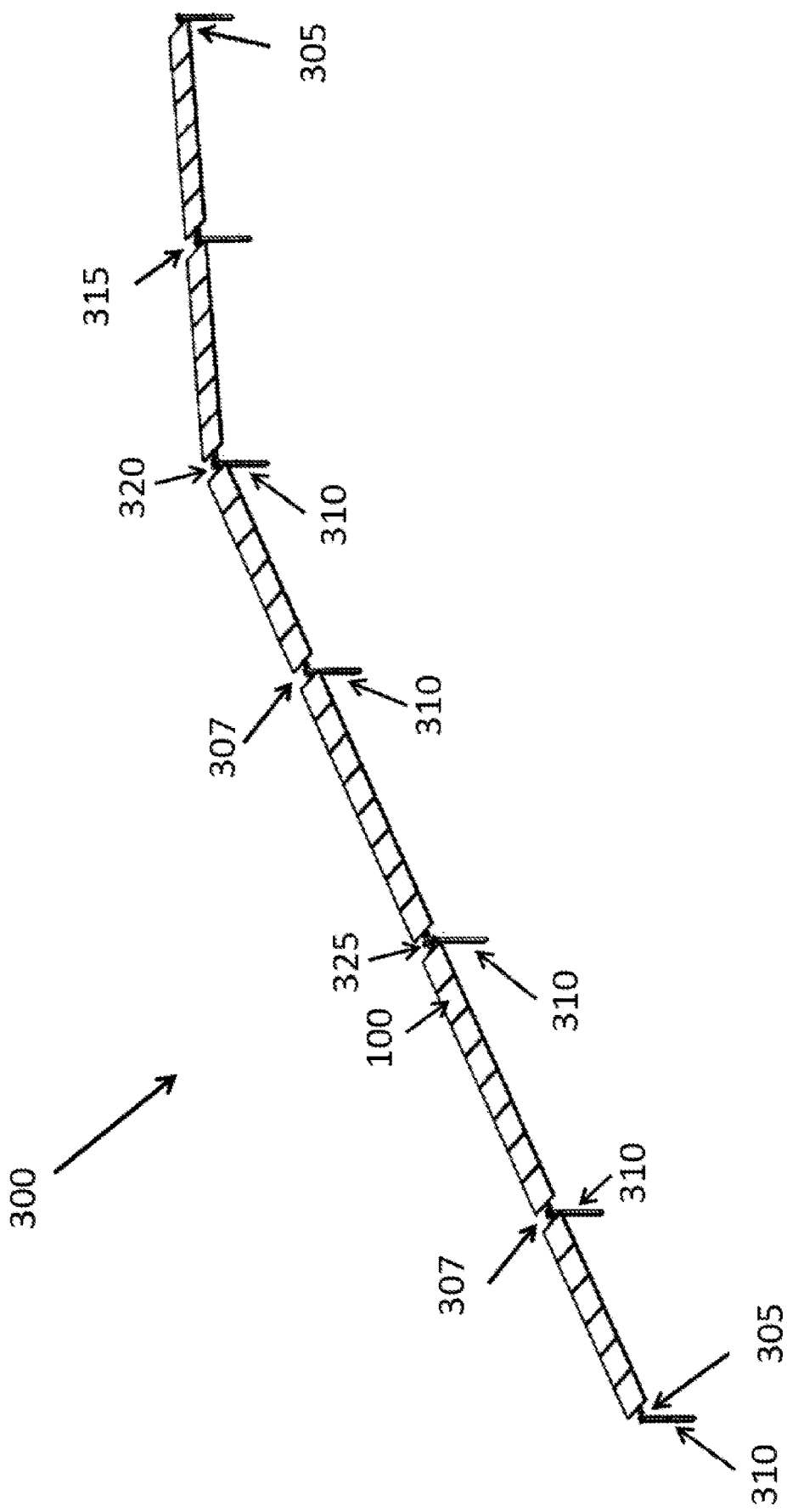
FIG. 31 shows an all-terrain solar tracker with angle changes along its length to follow the natural terrain.

FIG. 31 shows an example of an individual all-terrain solar tracker (such as included in the solar array site described above) arranged on varying terrain with angle changes along its length to follow the natural terrain. This tracker employs examples of many of the components that may or may not be present in a tracker. These components include articulated bearings supporting significant changes in angular orientation between adjacent segments of the torque tube, flexure bearings supporting smaller changes in angular orientation between adjacent segments of the torque tube without requiring an articulated bearing, straight through bearings, mechanical stops limiting rotation of the tracker, and a row end bearing. The tracker in addition includes a slew drive configured to drive rotation of the torque tube around its long axes. Although the example of FIG. 4 and other figures shows a particular arrangement of certain components, other variations may employ any suitable combination and arrangement of the components described in this disclosure. Some elements illustrated in certain figures may be unlabeled in those figures and only be labelled in other figures, for convenience and clarity of illustration and to avoid repetition.

Figure 4:
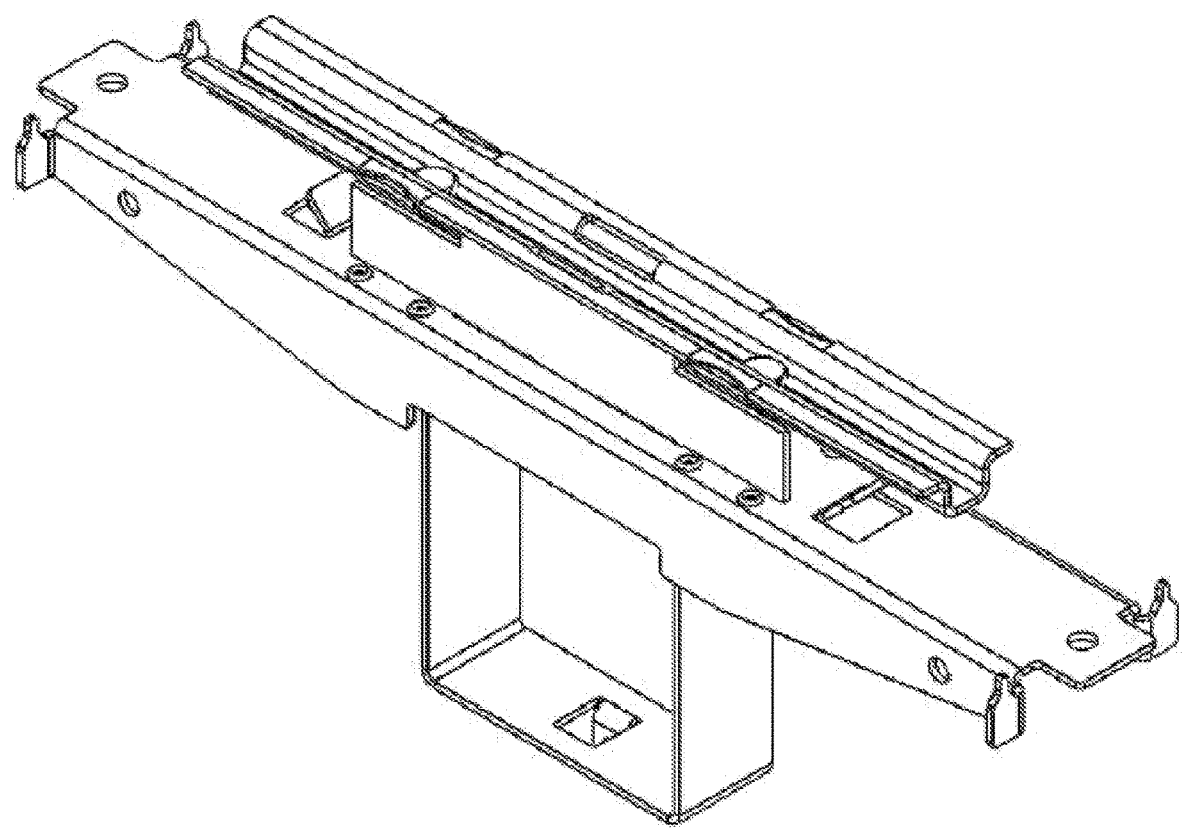
FIG. 4 shows a perspective view of a solar module clip. The standoff is placed on one side here between the lower rail and the upper rail in order to prevent the upper rail from teetering over due to the solar panel secured on the opposing side (not illustrated).

The variable terrain and single axis solar tracker 300 of FIG. 4 employs support posts 310, solar panel module supports 304 such as torque tubes extending between the support posts, and solar panel modules 301 supported by the torque tubes. Multiple solar panel modules may be between each of the support posts, and they may all be of a same size as one another, or some of them may be different sizes from each other. The solar panel modules may each comprise a solar module frame which supports the solar cells in the panels. The number of solar panel modules between each of the support posts may be the same along the tracker, or it may vary depending on the terrain and the spacing of specific support posts.

This example variable terrain solar tracker is arranged on uneven terrain and includes two rotation axes: a first rotation axis arranged along a slope, and a second horizontal rotation axis along a flat portion of land above the slope. The angle between the first rotation axis and the second horizontal rotation axis may be, for example, ≥0 degrees, ≥5 degrees, ≥10 degrees, ≥15 degrees, ≥20 degrees, ≥25 degrees, ≥30 degrees, ≥35 degrees, ≥40 degrees, ≥45 degrees, ≥50 degrees, ≥55 degrees, ≥60 degrees, ≥65 degrees, ≥70 degrees, ≥75 degrees, ≥80 degrees, ≥85 degrees, or up to 90 degrees. These examples refer to the magnitude of the angle between the first rotation axis and the second horizontal axis. The angles may be positive or negative.

Various types of assemblies may be disposed on top of support posts, depending on the terrain and the position of the support post with relation to the rest of the trackers: straight-through bearing assemblies 307 for sloping planar surfaces, flat land bearing assembly 315 for flat land, row end bearing assembly 305 for an end of a the tracker, articulating joint bearing assembly 320 for changing terrain angles, and slew drive assembly 325 at an end of the tracker or an intermediate position along the tracker in order to drive rotation of the tracker.

For example, opposite ends of the tracker are rotationally supported by row end bearing assemblies 305 on support posts 310. The portion of the tracker arranged on the slope is supported by straight-through bearing assemblies 307, which include thrust bearings that isolate and transmit portions of the slope load to corresponding support posts 310. The portion of the tracker arranged on flat land, above the slope, is rotationally supported by a flat land bearing assembly 315 which may be a conventional pass-through bearing assembly lacking thrust bearings as described above. The slew drive assembly may drive rotation of the solar panel modules 301 about the first and second rotation axes to track the sun. The solar panel modules 301 may be supported on torque tubes that are parallel with and optionally displaced (e.g., displaced downward) from the rotation axis of the slew drives. The torque tubes may also be aligned with rather than displaced from the rotation axis of the slew drives. Articulating joint bearing assembly 320 links the two non-collinear rotation axes and transmits torque between them. Example configurations for bearing assemblies 305, 307 and 320 are described in more detail below.

Other variations of the variable terrain solar tracker 300 may include other combinations of bearing assemblies 305, 307, 315, and 320 arranged to accommodate one, two, or more linked rotational axes arranged along terrain exhibiting one or more sloped portions and optionally one or more horizontal (flat) portions. Two or more such trackers may be arranged, for example next to each other in rows, to efficiently fill a parcel of sloped and/or uneven terrain with electricity-generating single axis tracking solar panels.

As noted above articulating joint bearing assembly 320 accommodates a change in direction of the rotational axis along the tracker. As used herein, "articulating joint" refers to a joint that can receive torque on one axis of rotation and transmit the torque to a second axis of rotation that has a coincident point with the first axis of rotation. This joint can be inserted between two spinning rods that are transmitting torque to allow the second spinning rod to bend away from the first spinning rod without requiring the first or second spinning rod to flex along its length. One joint of this type, which may be used in articulating joint bearing assemblies as described herein, is called a Hooke Joint and is characterized by having a forked yoke that attaches to the first spinning rod, a forked yoke attached to the second spinning rod, and a four-pointed cross between them that allows torque to be transmitted from the yoke ears from the first shaft into the yoke ears of the second shaft.

A solar panel array control system electrically connected to the tracker may be provided, which may control operation of one or more solar panels in the solar array. Operation of the one or more solar panels may include positioning of the one or more solar panels. For example, the solar panel array control system may control an orientation of one or more solar panels. The control system may send signals to a solar panel supporting structure, which may affect the position of the one or more solar panels. The articulating joint may be capable of allowing a position of a solar panel to be controlled from the control system. The solar panel support structure affecting position of the one or more solar panels may include a slew drive and a controller directing the slew drive.

The solar panel modules 100 need to be positioned and secured onto the solar panel module supports (e.g., torque tubes). Module clips placed on the torque tubes can secure the solar panel modules to the torque tubes.

Figure 1:
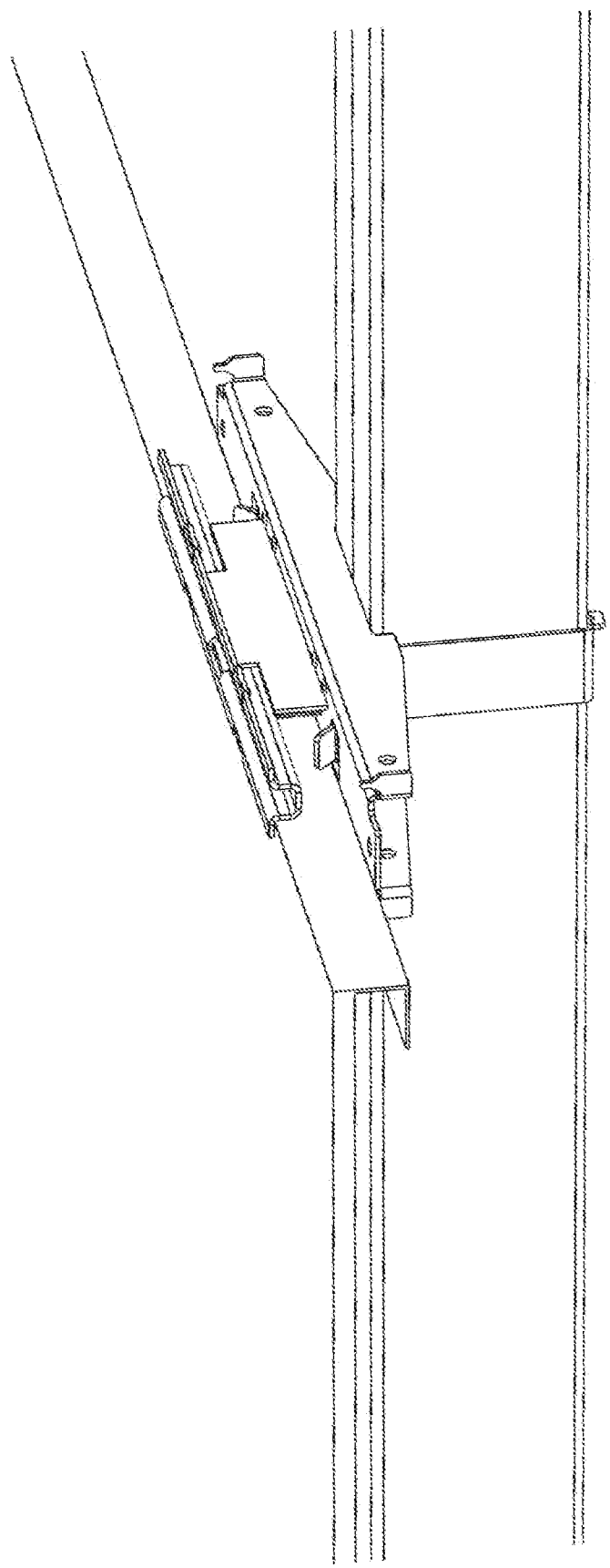
FIG. 1 shows an example of a solar module clip arranged on a torque tube to secure a bar representing an edge of solar panel module.
Figure 2:
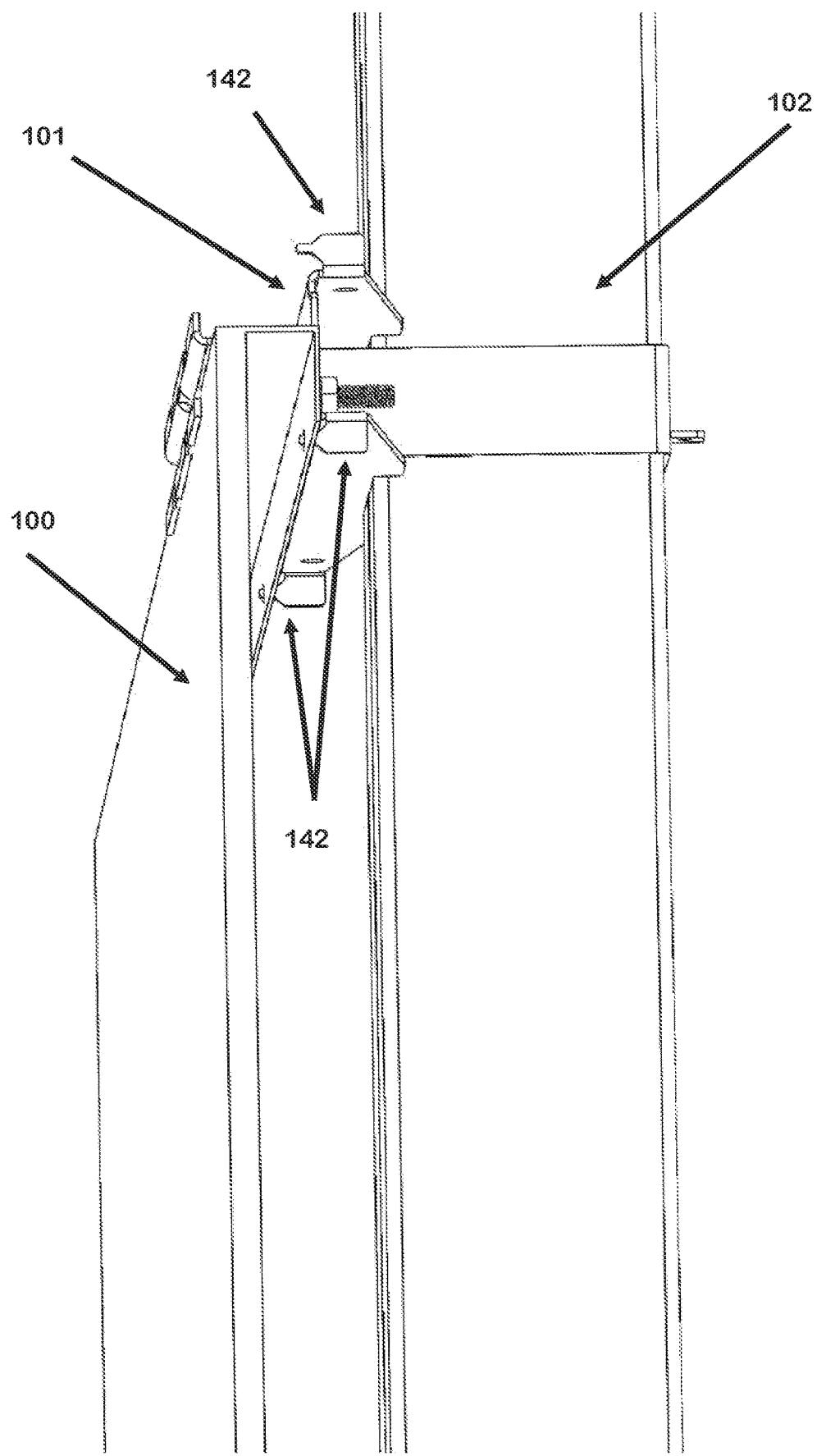
FIG. 2 shows an example of a solar module clip from arranged on a torque tube and securing a solar panel module.

FIGS. 1 and 2 show an example of a module clip 101 attached to a torque tube 102, which supports the solar module 100. The module clip 101 may be attached to any solar module support, not just a torque tube. As one example orientation in reference to FIGS. 1 and 2, north is to the top of the page (extending along with the direction of torque tube 102) and south is to the bottom of the page, with west approximately into the page and east approximately coming out of the page. The torque tube 102 may be connected to drives that allow them to rotate, which also rotates the solar modules mounted on the torque tube.

Figure 3:
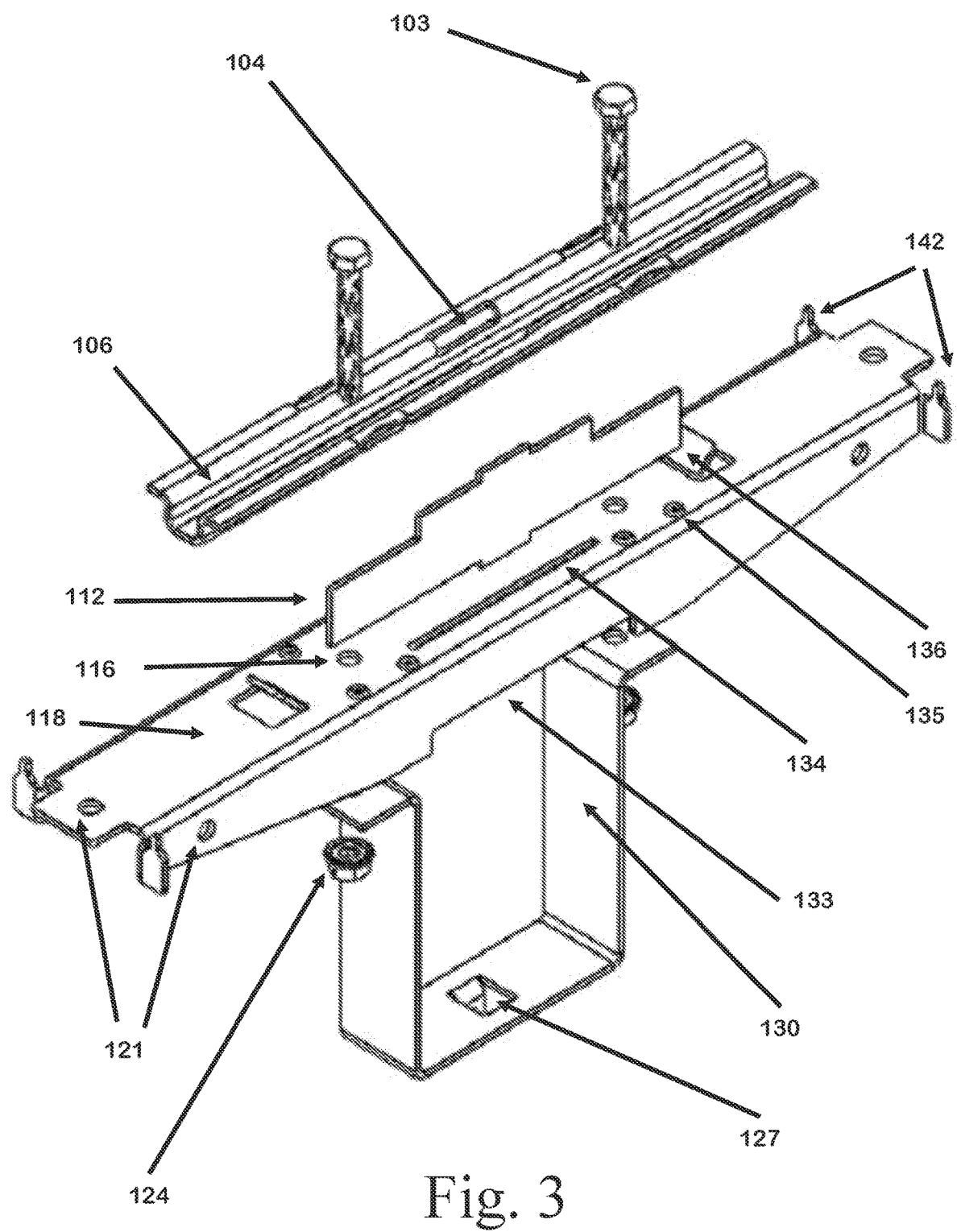
FIG. 3 shows an exploded perspective view of a solar module clip.

As shown in FIG. 3, the module clip 101 has an upper rail 106, a lower rail 118, a standoff 112, and a tube strap 130. The tube strap secures the rest of the module clip 101 to the torque tube. The tube strap 130 may be shaped with a cross section matching a torque tube or other solar module coupler, to secure the lower rail 118 to that torque tube or coupler. For example, the tube strap may be rectangular, square, round, and/or any other geometric shape in cross section. Bottom tab 127 sticking out of tube strap 130 has a hole in it where a wire or wires may be threaded through for better wire management, or where a wire hanger can be hooked into the hole so that the wires may be supported by the wire hanger.

Likewise, the lower rail 118 may have cable management holes 121 present that allow wires or wire hangers to be supported, supporting the same or different wires or hangers as each other or the hole in tab 127. The cable management holes 121 may be present in any North and/or South faces and the top face of the lower rail.

Figure 7:
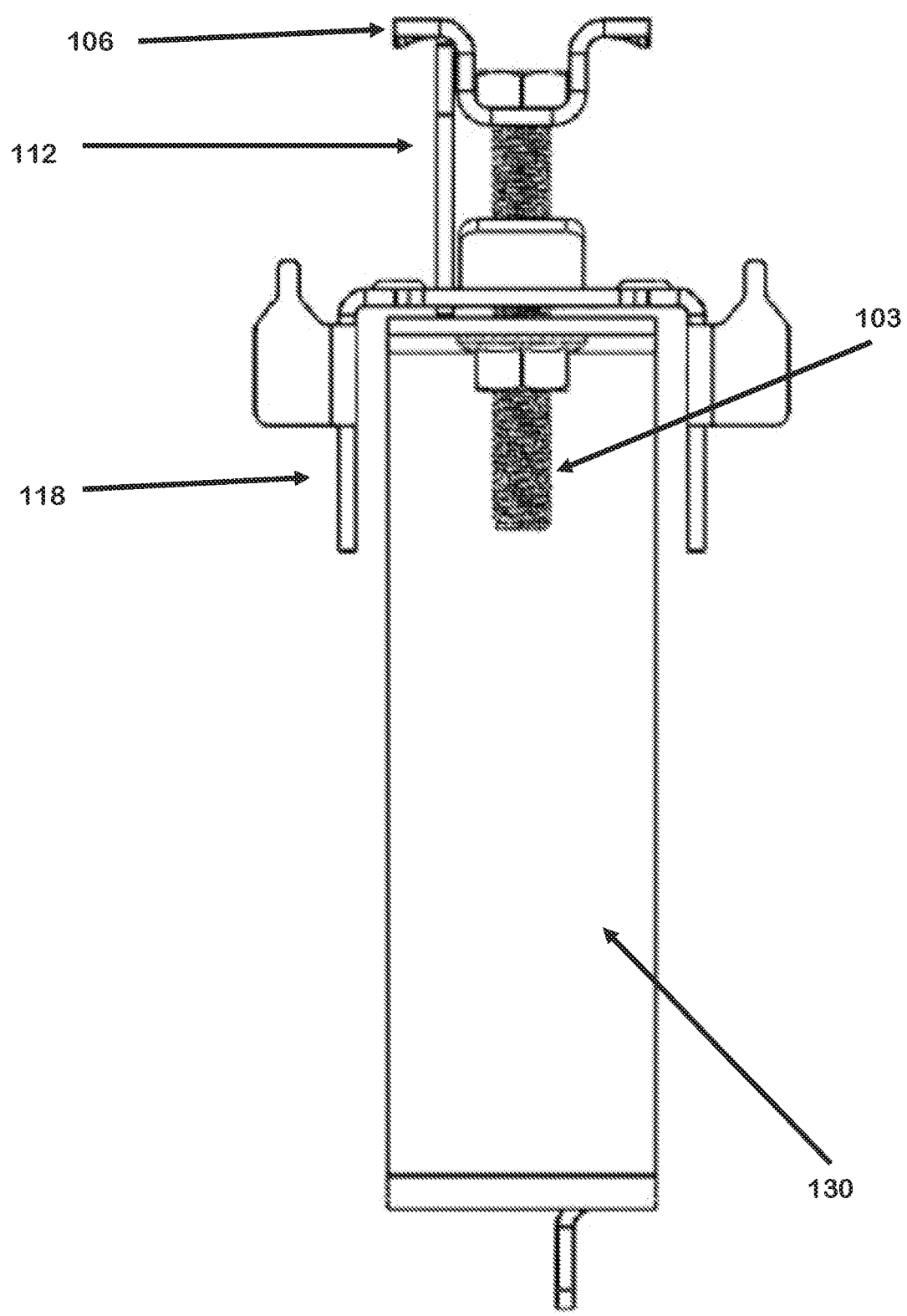
FIG. 7 shows a cross-section of a solar module clip as viewed from what is conventionally referred to as the East-West direction.
Figure 8:
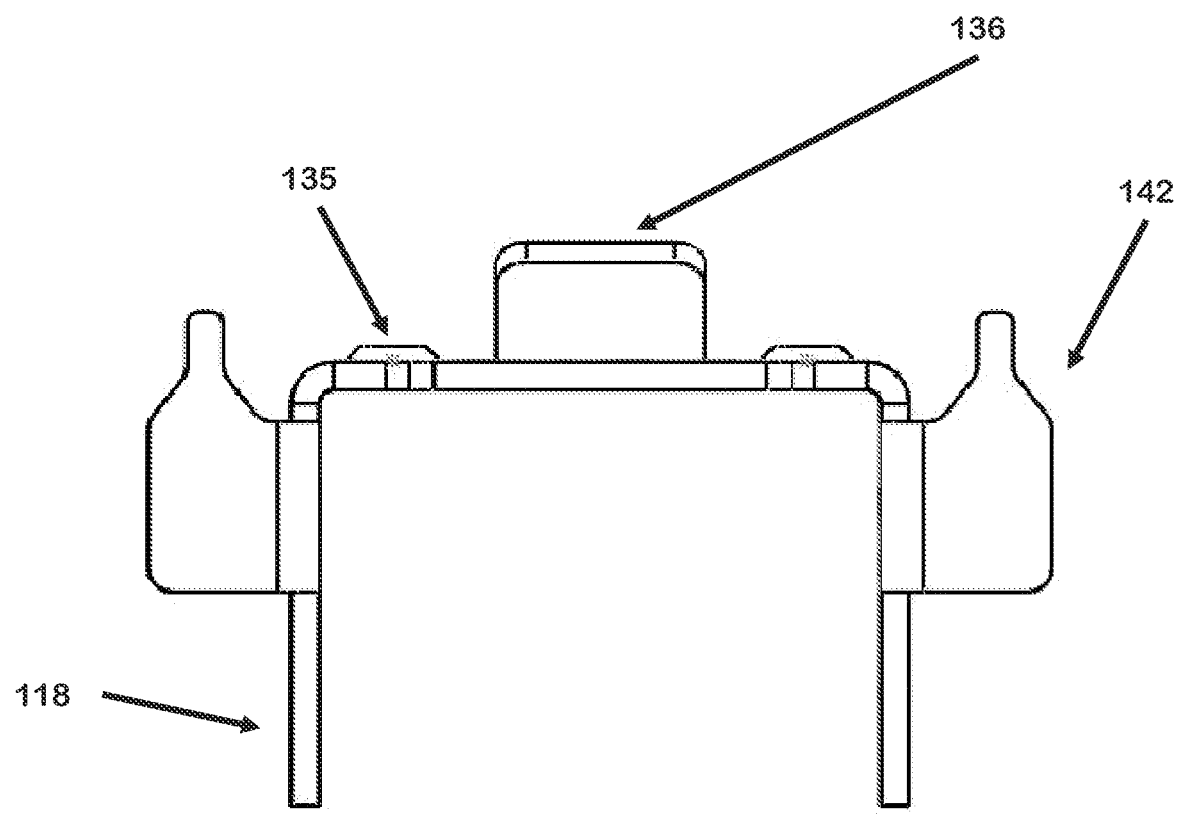
FIG. 8 shows a lower rail of a solar module clip as viewed from the East or West direction, without a tube strap or upper rail.
Figure 9:
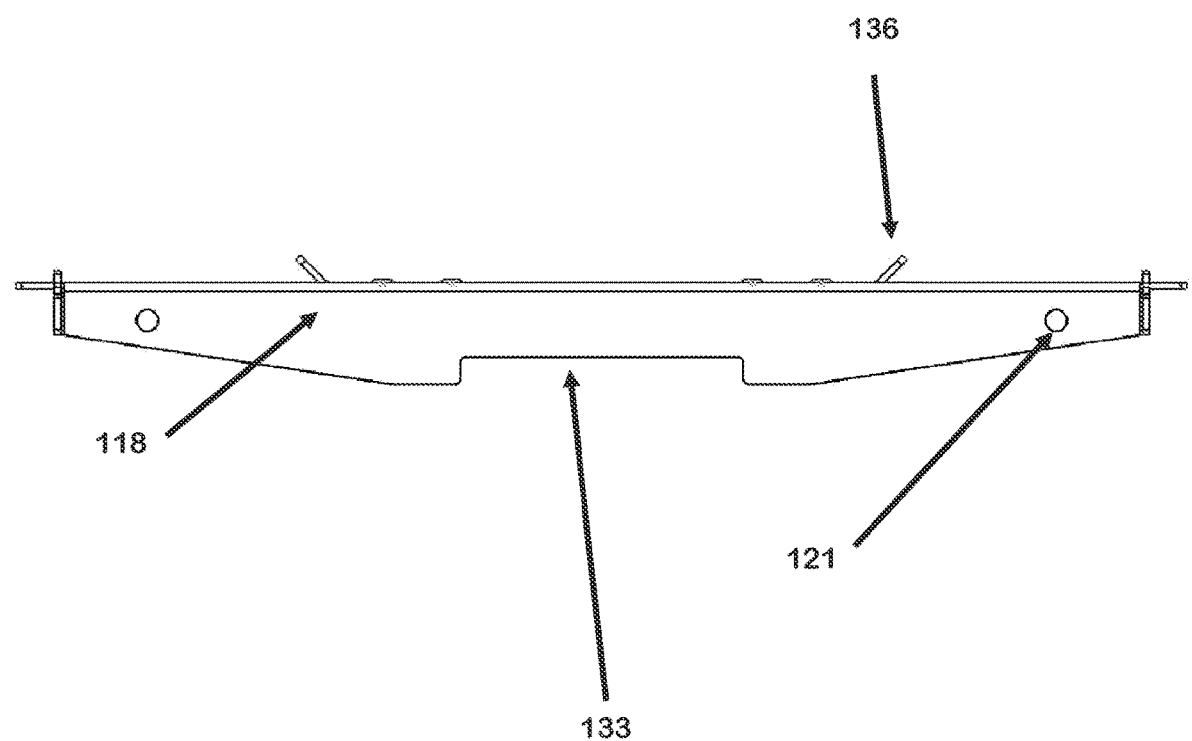
FIG. 9 shows a lower rail of a solar module clip as viewed from the North or South direction, without a tube strap or upper rail.

As shown in FIGS. 3 and 7, the lower rail 118 may have a top face, and a North and South face extending from the top face (in FIG. 7, North-South is to the left and right of the page). Each of the top face, the North face, South face may have a majority of their area in a respective plane. The plane of the top face may be perpendicular to the plane of the North face and the South face, and the plane of the North and South face may be parallel. The North and South face may be completely symmetrical with respect to each other about an imaginary center line through the plane of the top face running lengthwise (e.g. in the East-West direction).

Cutouts 133 are featured on the lower rail 118. For example, the cutouts 133 may be at the center of each of the North and South faces of the lower rail, for two cutouts 133 in total. The two cutouts 133 of the North and South faces may have matching shapes. The cutouts 133, along with the other alignment aids such as the lower rail tabs 142 and the module stop 136, allow quick and easy alignment of the lower rail onto the torque tube and alignment of the solar modules in relation to all the other elements of the tracker. Since the cutouts 133 may be shaped to match the width of the torque tube that the module clip is strapped to, and since the lower rail tabs 142 provide measuring guides to secure the solar panel modules to the module clip, the arrangement of solar module in relation to the torque tube can be achieved without additional measuring, the use of alignment jigs or spacers, or eyeballing during installation. The cutouts 133 may be rectilinear to match a rectangle or square torque tube, or may comprise a curve to match a round torque tube. The cutout 133 taken together with the shape of the tube strap 130 may match the complete shape of the torque tube cross section.

The lower rail 118 may have four corners, for example where the lower rail tabs 142 are disposed as shown in FIG. 3. The top surface of lower rail 118 may extend past the corners of the lower rail 118 and past the north and south face of the lower rail 118, as shown in FIG. 3 where the cable management holes 121 at opposite ends of the lower rail 118 are disposed on extensions protruding past the four corners of lower rail 118.

Lower rail tabs 142 may have any shape that allows them to be inserted through holes in a solar panel module 100 to secure and constrain the solar panel module 100. In an embodiment, the lower rail tabs 142 may have a bottle-like shape with a neck sticking up that goes through holes in a solar panel module 100 as shown in FIG. 2, where the bottle-like shape comprises a wider portion that slopes inward into a narrower portion comprising the neck. The neck of the lower rail tab 142 may extend above the top surface of lower rail 118, so that the lower rail tabs 142 will extend through the holes of the solar panel module 100 placed on top of the lower rail 118. If the lower rail 118 extends in a first direction (e.g., east or west when installed), the lower rail tabs 142 may also each be extending in a second direction perpendicular to that first direction (e.g., north or south when installed) that is a same direction as the extension direction of the torque tube or solar module support 102. Generally, it may be difficult to align solar panel modules 100 east and west. Lower rail tab 142 helps align the solar panel modules 100 during installation by providing easy to use visual markers. The solar panels may have holes on their bottom surfaces which match the width between two lower rail tabs 142 on the same North or South face, as shown in FIG. 2 with the lower rail tabs 142 protruding through the holes of the solar panel. Additionally, the solar panel modules 100 may experience shaking from natural forces or otherwise, such as extreme wind events or earthquakes. Lower rail tab 142 helps secure and retain the solar panel modules 100 so they are less likely to fall off, restraining any movement in the north-south and east-west direction. There may be one or more lower rail tabs 142 on the lower rail 118. For example, the lower rail 118 may have two tabs on only the north or south side, and no tabs on the other side. Alternatively, the lower rail 118 may have two tabs on both the North and South side, so that four corners of the lower rail 118 may each have a lower rail tab 142 extending out of it for a total of four tabs, as illustrated in FIG. 3. There may be more than four tabs in the lower rail, such as six or less, or eight or less. The tabs may be disposed at ends and/or corners of the lower rail 118, or adjacent to ends and/or corners of the lower rail 118. As shown in FIG. 2, some of the lower rail tabs 142 may work in conjunction to support one solar panel module 100 without employing other ones of the lower rail tabs 142. That is, in an embodiment illustrated in FIG. 2, two of the lower rail tabs 142 disposed both on the South face of the module clip 101 (nearest the bottom of the page) support the solar panel module 100 together. These lower rail tabs 142 spaced apart in the East-West direction may be spaced apart about 100 to 800 millimeters apart from each other, 200 to 600 millimeters apart from each other, and, in an embodiment, about 400 millimeters apart from each other. The lower rail tabs 142 may be spaced apart from each other at any distance in the East-West direction depending on the distance of the holes in the solar panel module, which may depend upon the preference of the solar panel module manufacturer. In FIG. 2, considering the vertical direction running from the top of the page to the bottom of the page, there are three visible lower rail tabs 142. Out of these three visible lower rail tabs 142, one is the topmost, one is the middle, and one is the bottommost. The topmost lower rail tab 142 is on the North face of the module clip 101 and the middle lower rail tab 142 is on the South face of the module clip 101. These two tabs are aligned to run together in the North-South direction. The North-South tabs of the module clip 101 may be spaced apart based on the dimensions of the solar module panel 100. In particular, the distance from a hole to the edge of the solar module panel 100 may determine the distance that the North-South tabs of the module clip 101 are spaced apart; in an embodiment, the distance that the North-South tabs are spaced apart is double the distance from a hole in the solar module panel 100 to the edge of the solar module panel. This spaced apart distance may change based on solar module panel 100 dimensions. In an embodiment, two adjacent solar module panels 100 placed on the module clip 101 have a gap between them, for example between 10-25 millimeters (mm), e.g. around or at 18 mm. In this case, the distance that the North-South tabs are spaced apart is greater than double the distance from the hole in the solar module panel 100 to the edge of the solar module panel, e.g., double that distance plus the gap between the adjacent solar module panels 100.

Module stops 136 protrude from the top surface of the lower rail 118. The module stops 136 may be formed by cutting out a portion of the top surface of the lower rail 118 and angling it upwards at an obtuse angle with relation to an uncut portion of the top surface, so that the top surface ends up with module stop holes beneath the module stops 136, as shown in FIG. 3. When solar panel modules are slid onto the lower rail 118, the module stops 136 provide a physical stop to prevent the solar panel modules from moving any further than the module stops 136. For example, if two solar modules are clipped on opposing sides of the module clip, the module stops 136 may directly contact each of them on either side to prevent them from contacting each other. That is, the module stops may be directly between two solar panels secured to the same module. There may be two or more module stops 136 in the lower rail 118. They may be spaced apart from each other to be wider than the length of standoff 112, discussed further below, and shorter than the distances between lower rail tabs 142. They could also be aligned with the lower rail tabs 142 in the North-South direction, and/or spaced apart the same distance as the length of the module clip 101 in the East-West direction, i.e. respectively disposed at the East-West ends of the module clip 101. Each module stop 136 may be wider and/or longer than a diameter of the bolt hole 116.

Lower slots 134 for standoffs are available in the lower rail 118 in case standoffs 112 are desired to prevent the upper rail 106 from teetering on the device. When two solar module panels are clipped on opposing sides from each other in the module clip 101, the upper rail 106 will be balanced. However, if the module clip is placed at the end of a line of solar panels, and the module clip secures only one solar panel on one side and no solar panel on the opposing side, the upper rail 106 could fall over from the imbalance. The standoff 112 addresses this imbalance and provides support on the side where there is no solar module clipped in so that balance is achieved. FIG. 7 depicts a standoff between the upper rail and lower rail with the bolts fastening all the elements together. In the example of FIG. 7, there could be a solar panel on the opposing side of the standoff 112. There may be two lower slots 134 on the lower rail 118 to support a standoff 112 on each side of the rail. For example, only one standoff 112 may be installed at any time to balance out a module clip that secures only one solar panel. When two solar panels are clipped in, no standoffs 112 may be necessary so no standoffs 112 may be used. The lower slots 134 and the installed standoffs 112 themselves may be offset from the imaginary center line of the top surface of the lower rail 118 that runs in the East-West direction. That is, the lower slots 134 may be between the edge of the top surface of the lower rail 118 and the center line of the lower rail 118.

Figure 5:
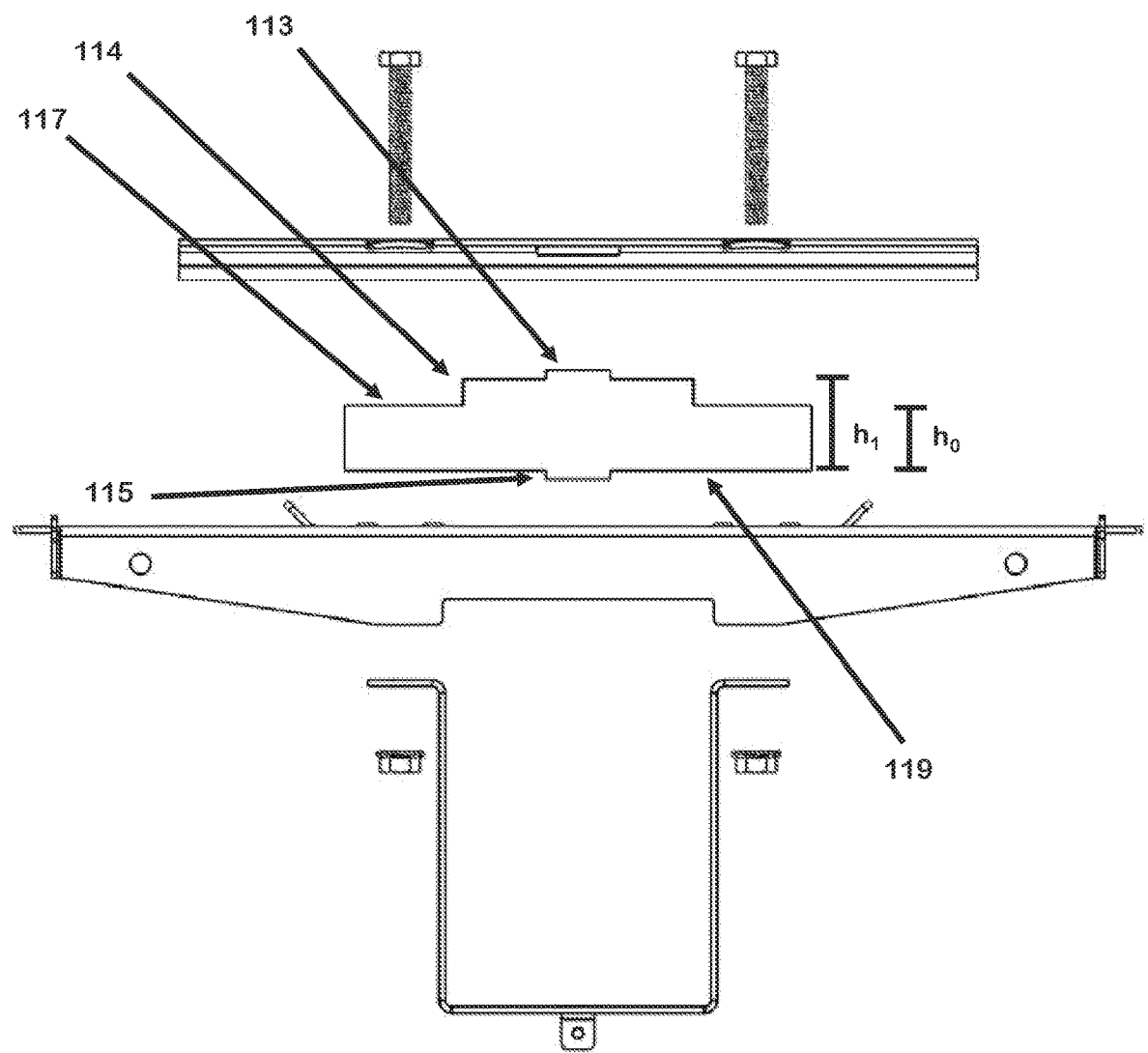
FIG. 5 shows an exploded view of a solar module clip from what is conventionally referred to as the North-South direction, which is the direction of extension for the torque tube supporting the solar module clip.
Figure 6:
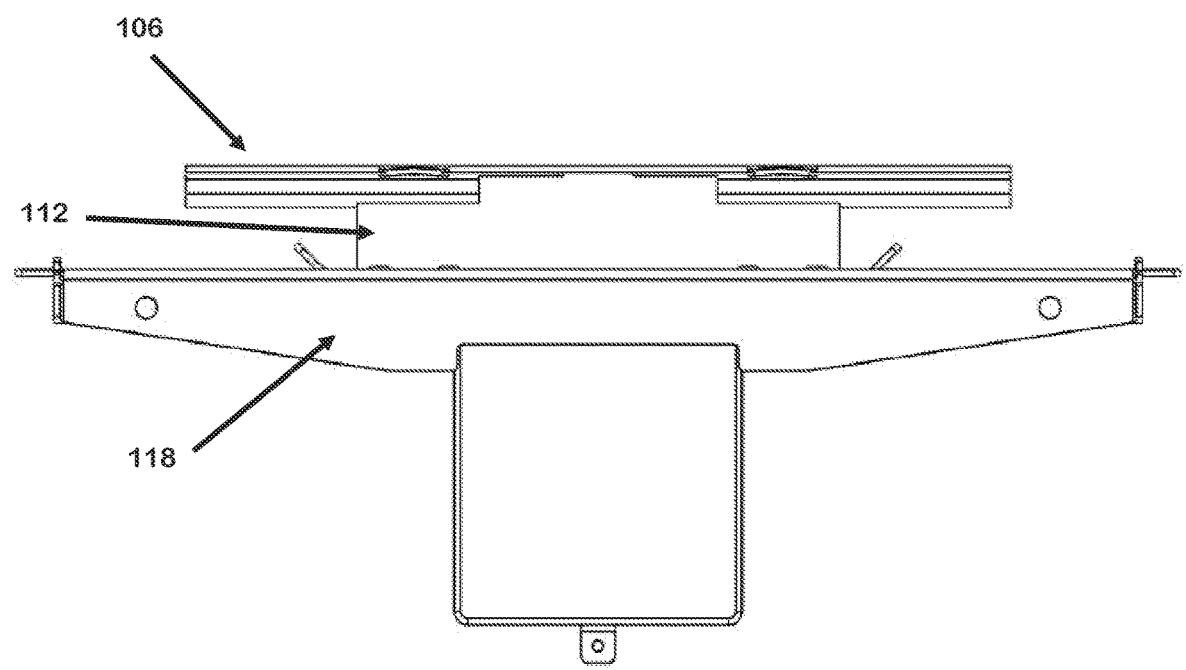
FIG. 6 shows a solar module clip as viewed from what is conventionally referred to as the North-South direction.

On one side, the standoff 112 has a variety of tabs of decreasing width going towards its center, shown in FIG. 5. That is, the standoff 112 may have multiple tabs on one side and a lesser number of tabs on the opposing side. For example, the standoff 112 may have two tabs of decreasing width on one side, a narrow tab 113 and wide tab 114, and one opposing tab 115 on the opposing side of the standoff 112. Each of the tabs on the same side that are narrower than the others may be positioned on and protrude from those tabs that are wider than themselves, e.g., positioned on and protruding from the center of those wider tabs. The opposing tab 115 may have the same width as the smallest tab on the other side, for example, or it may have a different width. The asymmetric width and heights of tabs on the two sides allows the standoff 112 to space out the rails to accommodate at least two different heights, depending on the specific height of the solar module which is to be secured in the module clip. For example, FIG. 5 shows the standoff 112 with the multiple tab side facing up. The narrow tab 113 on that side slots into the upper slot 115 of the upper rail 106, and the opposing tab 115 slides into the lower slot 134 in the upper rail. As a result, the top edge of wide tab 114 is in contact with the lower surface of the upper rail 106, and the edge of the standoff 112 from which the opposing tab 115 protrudes is likewise in contact with the upper surface of the lower rail 118, resulting in a spacing of height h1 between the lower rail and the upper rail. That is, height h1 is the distance from the standoff edge 117 from which the opposing tab 115 protrudes to the upper edge of the wider tab 114. When the standoff 112 is flipped so that the wider tab 114 faces the lower rail 118 instead of the upper rail 106, the wider tab 114 slots into the lower slot 134 and the opposing tab 115 slots into the upper slot 104 of the upper rail 106. Since the standoff edge 117 from which the wider tab 114 protrudes is pushed against the upper surface of the lower rail 118, and the opposing edge 119 from which the opposing tab 113 protrudes is pushed against the lower surface of the upper rail 106, a smaller height h0 is achieved which is the distance between those two edges 117 and 119. This smaller height h0 is now the spacing between the lower rail and the upper rail when the bolts 103 secure them together. As a result, the standoff 112 allows the module clip to advantageously accommodate two different heights of solar modules simply by flipping its orientation. As an example, the standoff 112 allows the module clip to accommodate solar modules with heights in the range of 40-50 mm (millimeters), for example in the range of 25-35 mm. The height of the standoff 112 may also be changed to accommodate different heights based on the requirements of the solar panel module 100. In a solar module tracker with multiple module clips, some solar modules may be angled from one end installed at one module clip to an opposite end installed at another module clip, for example angled in the North-South direction. For example, a solar panel module 100 may have a height of 45 mm, and the standoff may be 50 mm in height. The solar panel module 100 may be installed at an angle, and because the standoff is taller than the height of the solar panel module 100, it accommodates the angle of installation. Thus, the range of height accommodation allows not only securing different heights of solar modules, but may accommodate different angles of solar modules as well.

Bolt holes 116 allow bolts 103 going through the upper rail 106 to pass through the lower rail 115. The bolts 103 may pass through the tube strap 130 as well. There may be one or more bolt holes 116 in the lower rail, for example two to four. The bolt 103 may be fastened via a nut 124 on the underside of the tube strap 130.

Bonding features 135 protrude from the lower rail 118. Bonding features 135 are any types of sharp protrusions, e.g., flared punches in the metal of the lower rail 118. The bonding features 135 are placed near the bolt holes 116. In FIG. 3, they are illustrated to have four bonding features 135 surrounding each bolt hole 116 to form a rectangular shape, though they may be any number in any configuration as long as they are in proximity to a respective bolt hole 116. When the bolts 103 are tightened to secure the solar panel modules, the modules are pressed tightly against the sharp edges of the bonding features 135, so that the sharp edges cut through the outer anodization of the solar panel module frame (which is, e.g., made of aluminum and typically has strong anodization). The anodization is cut through to contact the aluminum of the solar panel module frame with the bonding features 135 so that good electrical grounding is achieved. As illustrated, there are eight total bonding features 135 on the lower rail 118, though they are not so limited and may have any number.

The features (e.g., bolt holes, module stops, etc.), shape, and/or position of the top face of the lower rail 118 described above, as well as the features, shape, and/or positions of the North and South face, may be completely symmetrical about both an imaginary center line running through the top face of the lower rail extending in a first direction that is lengthwise (e.g., in the East-West direction) and an imaginary center line running through the top face of the lower rail extending in a second direction perpendicular to the first direction that is widthwise (e.g., in the North-South direction). Alternatively, the lower rail 118 may have asymmetrical features, shape, and/or position about such imaginary lines.

The upper rail 106 may be an aluminum extrusion, or any other type of suitable material such as other types of bent sheet metal. In one example, it is a hat channel. As mentioned above, the upper rail 106 has upper slots 104 for any potential standoffs to slot into, as well as bolt holes for bolts 103 to secure the upper rail 106 to the lower rail 118. More specifically, the bottom surface of the upper rail 106 is secured against and directly in contact with an upper edge of a solar panel, whose lower edge is directly in contact with an upper surface of the lower rail 118. The upper rail 106 is depicted to have a smaller width than the lower rail 118, but it may have the same width or a greater width.

A module clip as described may be positioned and secured on a torque tube using positioning and/or securing features on the torque tube. Certain parts of the module clip are designed to fit with or pair with the features on the torque tube. These parts and features will collectively be referred to as complementary features. The module clip has a first type of complementary feature and the torque tube has a second type of complementary features designed to work in conjunction with the first type to position and/or secure the module clips. More specifics on these complementary features will follow.

When one of the complementary features are included on the torque tube, they are set at a predetermined distance from each other. The predetermined distance is based upon the specific dimensions of solar modules to be set upon the torque tube, for example the width of the solar module in the North-South direction. However, after the torque tube has been manufactured with a predetermined spacing of complementary features, there may be a need or desire to change the type of solar modules to be attached to the torque tube. These different solar modules may have different sizes than the original solar modules. The predetermined spacing of complementary features in the torque tube may no longer be appropriate for these solar modules. Embodiments of the invention includes devices and/or method for relocating or adapting the complementary features of the torque tube.

"Relocating" or "relocation" as used herein refers to securing module clips to a torque, at least some of which may be at locations different from their original intended positions on the torque tube. The original intended positions may be based on the original complementary features manufactured onto the torque tube. Relocation may employ one or multiple devices described herein, used alone or in combination with other described devices. The devices may stay secured to the torque tube after the relocation is complete and the module clips are secured, or they may be removed from the torque tube once relocation is complete. A device for relocating module clips may be referred to as an adapter.

As mentioned above, the module clip may have one of the complementary features and the torque tube/adapter may have the other complementary feature designed to pair with the complementary feature of the module clip. Complementary features designed to pair and work with each other include dimples and holes, positioning tabs and slots, and sight guides and marks, among other similar features. A dimple is designed to be inserted into a hole, a positioning tab is designed to be inserted into a slot, and sight guide is designed to frame a mark. For dimples and holes, as well as positioning tabs and slots, one of the features may be on the module clip and the paired feature will be on the torque tube and/or adapter.

Figure 12A:
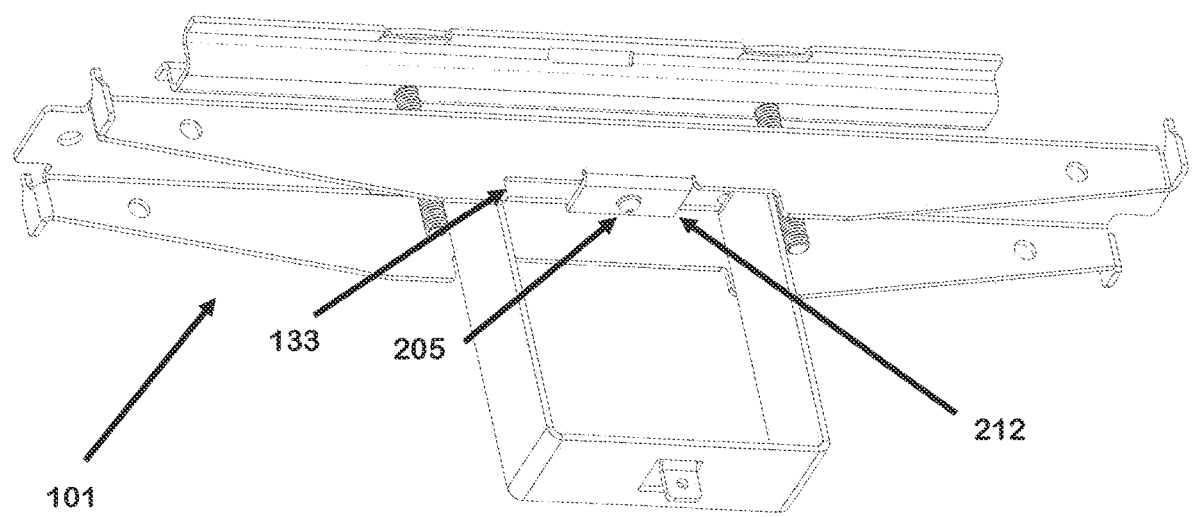
FIG. 12a shows a solar module clip with a dimple on a surface extending from the middle of its cutout to secure and position the solar module clip onto a torque tube.
Figure 12B:
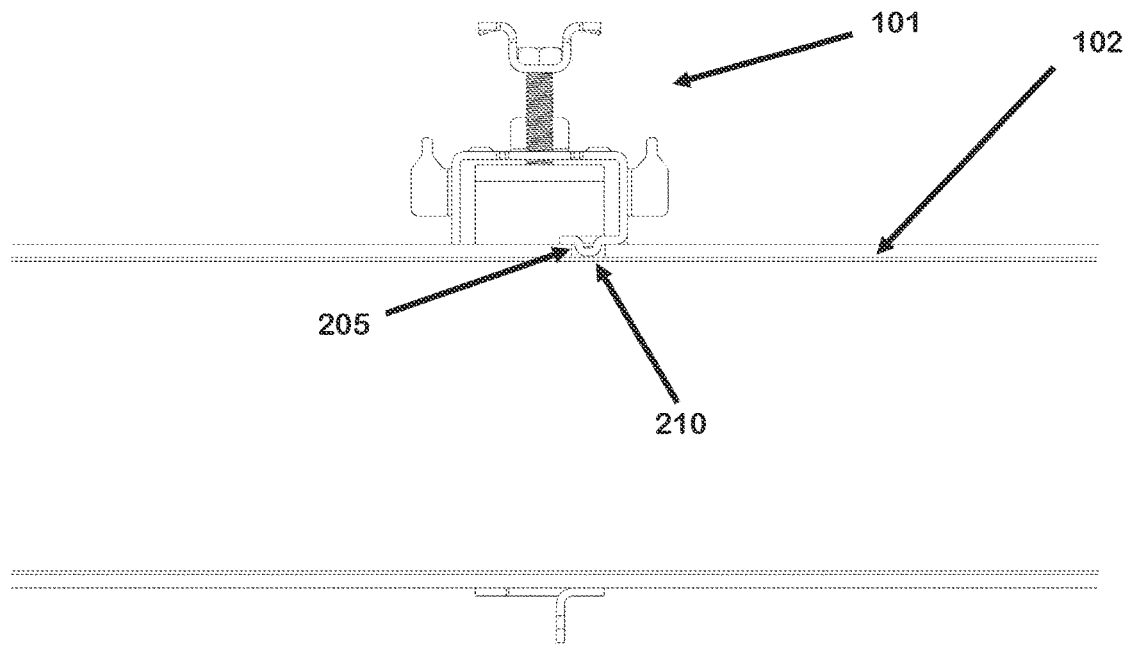
FIG. 12b shows a cross section of the solar module clip secured onto the torque tube as viewed from the East or West direction.

In an example, the module clip includes a dimple paired with a hole on the torque tube/adapter, such that when the module clip is positioned on the torque tube/adapter the module clip dimple fits into the torque tube/adapter hole. FIG. 12a shows an example of a module clip with a dimple 205 on an extended surface 212 extending from cutout 133. FIG. 12b shows the module clip clipped into a torque tube 102 with an original hole 210 on a torque tube.

In an example, the module clip includes a hole and the torque tube/adapter includes the dimple, such that when the module clip positioned on the torque tube/adapter the torque tube/adapter dimple fits into the module clip hole.

Figure 11A:
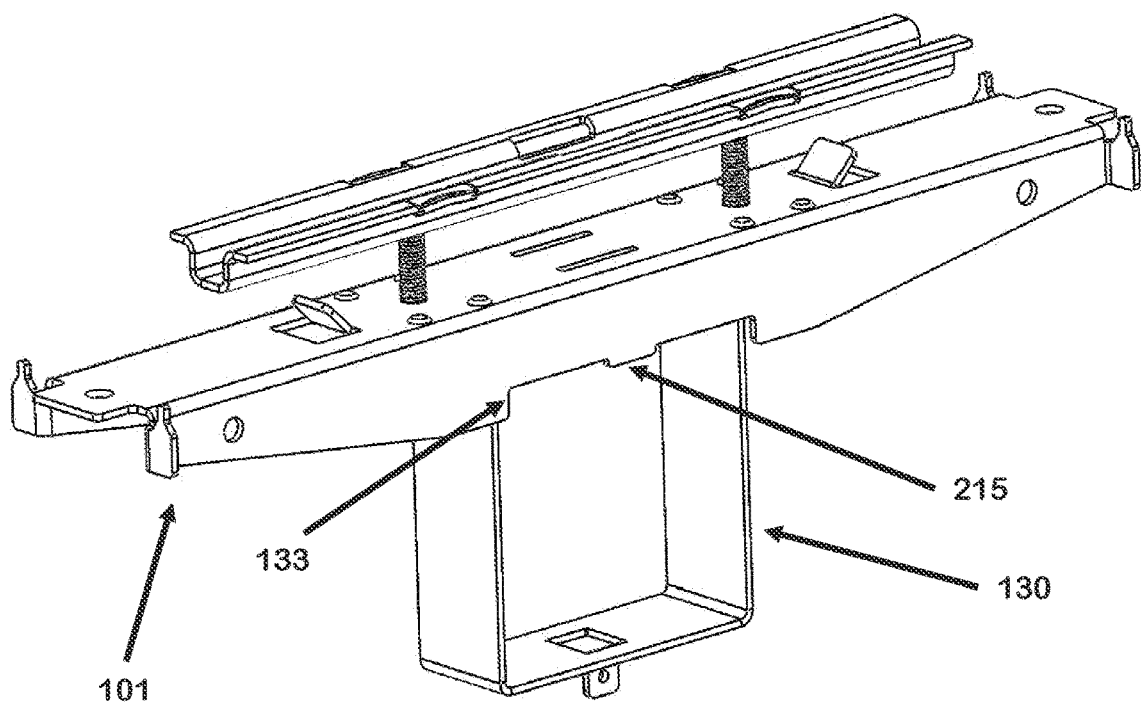
FIG. 11a shows a solar module clip with a tab in the middle of its cutout to secured and position the solar module clip onto a torque tube.
Figure 11B:
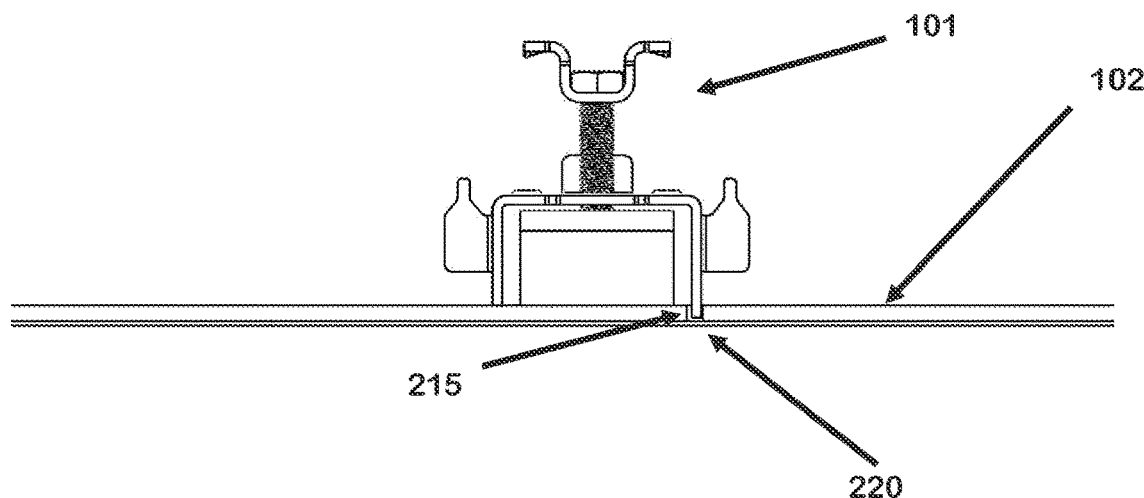
FIG. 11b shows a cross section of the solar module clip secured onto the torque tube as viewed from the East or West direction.

In an example, the module clip includes a positioning tab and the torque tube/adapter includes a slot, such that when the module clip is positioned on the torque tube/adapter the module clip positioning tab fits into the torque tube/adapter slot. FIGS. 11a and 11b show a module clip with a positioning tab 215 clipped into the torque tube original slot 220.

In an example, the module clip includes a slot and the torque tube/adapter includes a positioning tab, such that when the module clip is positioned on the torque tube/adapter the torque tube/adapter positioning tab fits into the module clip slot.

The module clip may have only a single one of the complementary features, and the torque tube/adapter may have a plurality of the paired complementary features, though these are not requirements. For example, the module clip may have a plurality of complementary features, all of the same type. For example, the torque tube/adapter may have only a single one of complementary features.

In terms of the shapes and volumes of complementary features, dimple and tabs may be protrusions from surfaces of the module clip or torque tube/adapter. A dimple may be a radially symmetric protrusion, and may have a circular or ovular cross-section. A positioning tab may be a protrusion having a length and width where the length is much longer than the width, for example equal to or more than two times longer, e.g. five times longer. As noted previously, a hole is designed to accommodate and/or constrain movement of a dimple by providing a shape and/or volume corresponding to that of the dimple may be inserted (i.e. corresponding means that the dimple is the same or substantially the same size as or smaller than the hole, and particularly that the dimple is large enough so that the module clip is secured by the hole without being unduly loose), while a slit is designed to accommodate and/or constrain movement by providing a shape and/or volume corresponding to that of the tab where the tab may be inserted. For example, the hole may have a circular opening and a hemispherical volume, or it may have a circular opening with a cylindrical volume. The tab may have a rectangular opening and an orthotope volume. The holes and slits may puncture entirely through the surface on which it is placed (for example in a surface of the module clip) or it may be an indentation with enough depth to accommodate the height of the corresponding dimple or tab, without puncturing entirely through the surface upon which the hole or slit is disposed.

Holes and slots may be shaped, respectively, to accommodate dimples and tabs within them, for example to have a similar or substantially the same length, diameter, and/or volume of the paired complementary feature. When the module clip is clipped into the correct position on the torque tube/adapter, the dimple may be inserted into the hole or the positioning tab may be inserted into the slot. The insertion of the dimple into the hole or the slot into the tab constrains the module clip from moving along the length of the torque tube and from rotating around the circumference of the torque tube. In this way the complementary features on the torque tube/adapter serve both as positioning features and retaining features for the module clips. Consequently, the solar panels clipped into the module clips are positioned based on the torque tube/adapter based on the positions of complementary features of the torque tube/adapter.

Figure 10A:
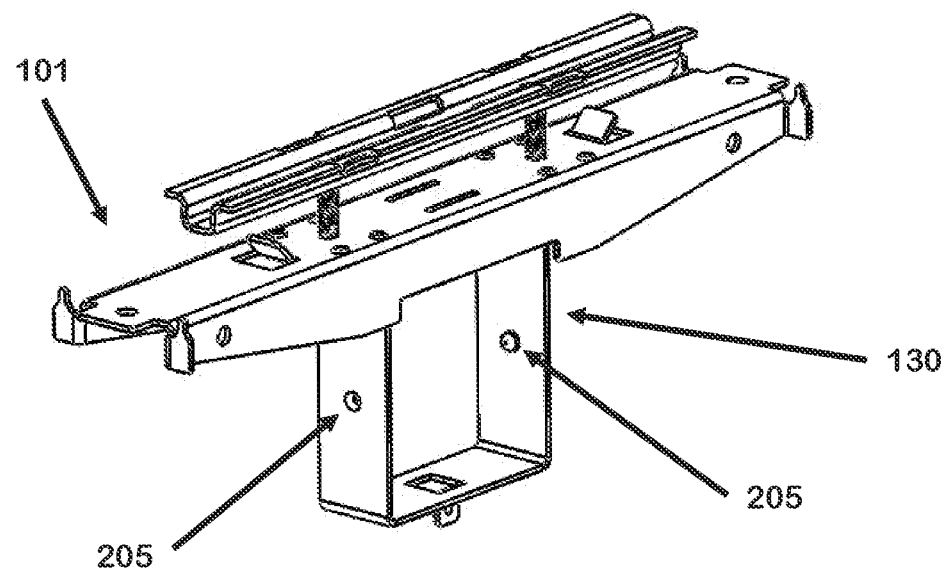
FIG. 10a shows a solar module clip with dimples on the tube strap to secure and position the solar module clip onto a torque tube.
Figure 10B:
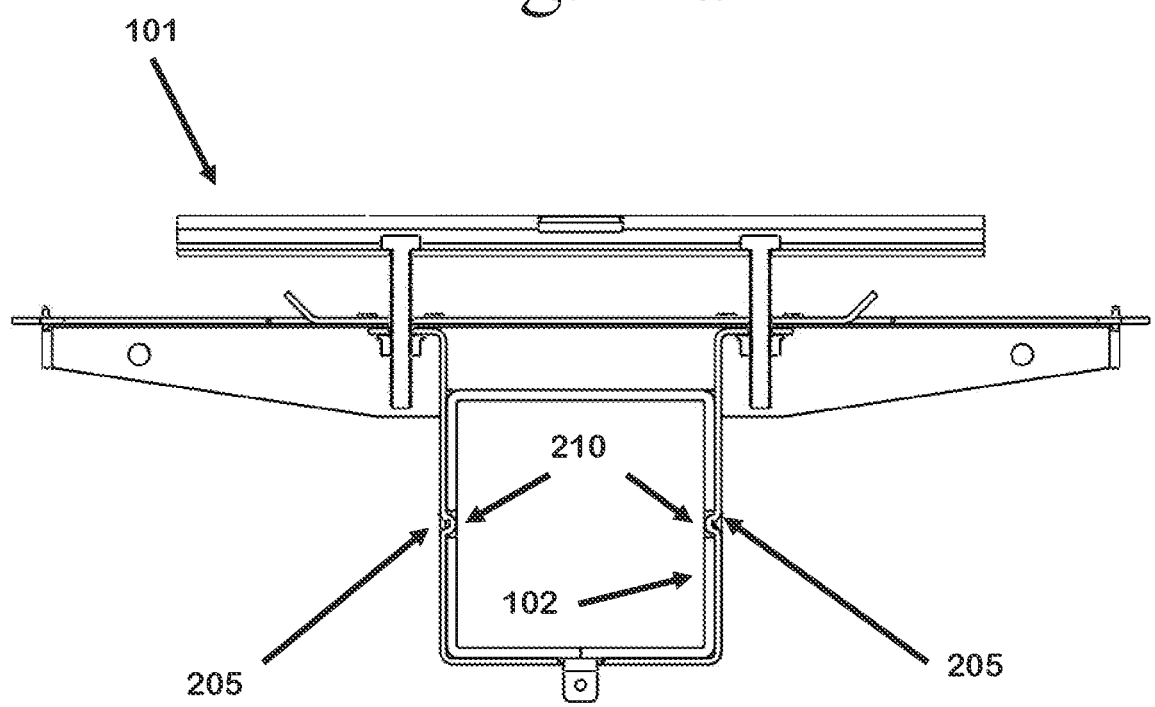
FIG. 10b shows a cross section of the solar module clip secure onto a torque tube as viewed from the North or South direction.

The complementary features included on the module clip may be positioned at varying locations. For example, dimple and tabs may be positioned on the tube straps (e.g., the inner surfaces of the tube straps, as shown in FIGS. 10a and 10b with two dimples 205 on opposing inner surfaces of the tube strap 130), in the middle of the module clip cutout (e.g., FIGS. 11a and 11b, where the positioning tab 215 protrudes from the middle of the cutout 133), on a surface extending from the middle of the cutout (FIGS. 12a and 12b, where the dimple 205 is on an extended surface extending from the cutout 133), among other surfaces and locations. When holes or slots are used on the module clip instead of dimples or tabs, they may be placed at the same locations as the dimples and tab positions described above.

The complementary features on the torque tube/adapter are positioned to correspond to the positions of the features on the module clip. For example, when the dimples on the module clip are placed on the two opposing inner surfaces of the tube strap, the holes 210 on torque tube 102 are placed on opposing side surfaces of the torque tube as shown in the cross section of FIG. 10b (the opposing side surfaces connect a top and bottom surface of the torque tube). In this position they can receive the module clip dimples when the tube strap is strapped around the torque tube. When the positioning tab 215 is placed in the middle of the cutout 133 on the module clip, the slot 220 is positioned at the top surface of the torque tube 102 to receive the positioning tab, as shown in FIG. 11b. When the dimple 205 is placed on an extended surface 212 extending from the middle of the cutout 133, a hole 210 is positioned at the top surface of the torque tube 102 to receive the dimple, as shown in FIG. 12b.

The complementary features on the torque tube/adapter may be spaced at predetermined distances from each other. The complementary features may be spaced at equal predetermined distances from each other. However, this is not a requirement, and the complementary features may be spaced at unequal predetermined distances from each other. The complementary features may be spaced apart from each other at a distance equal to or greater than a width of the solar panels in the North-South direction.

Figure 17A:
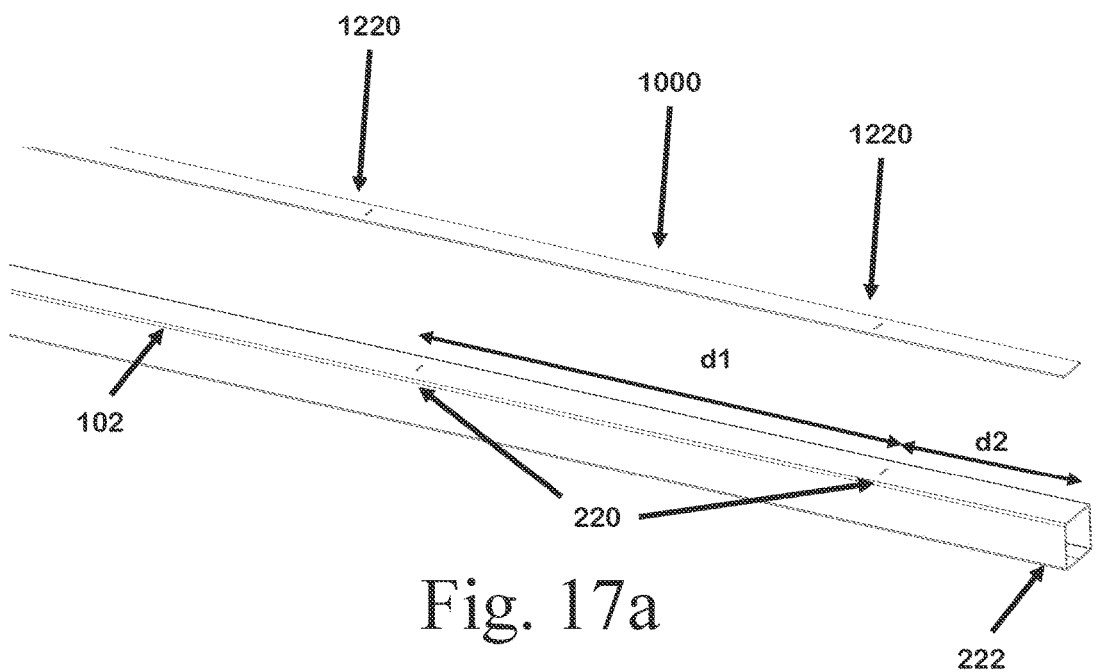
FIGS. 17a and 17b show a perspective view of an adapter to be positioned onto a torque tube and relocate the slots on the torque tube.
Figure 17B:
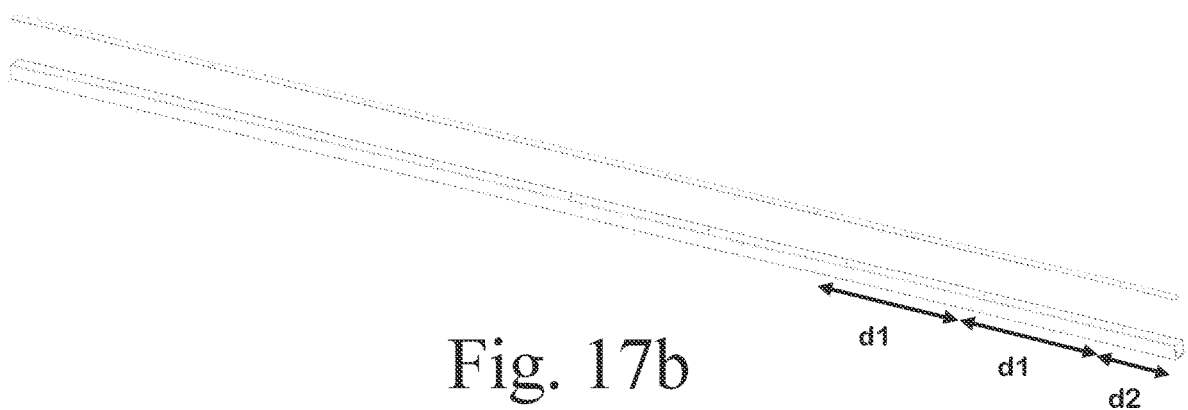
Figure 20A:
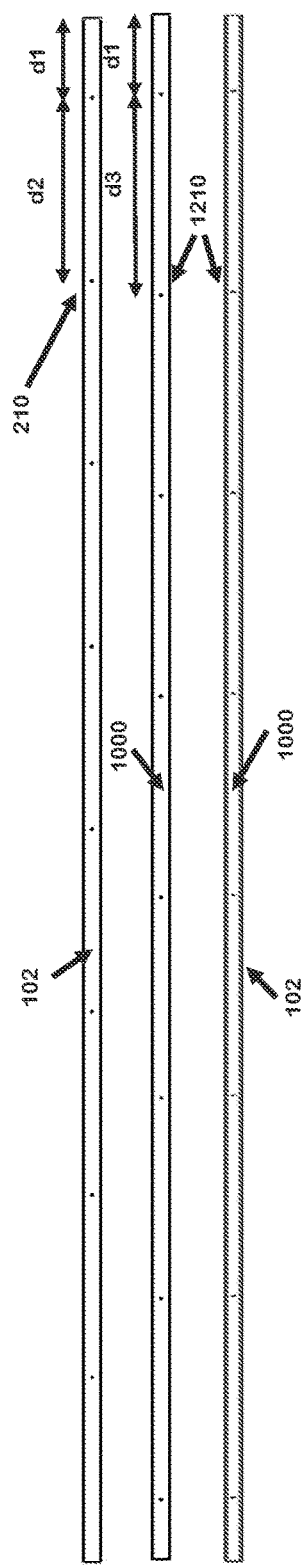
FIGS. 20a-c show top and side views of positioning features on adapters and torque tubes and how they differ from each other in position.

The complementary features adjacent to an end of the torque tube/adapter may also be spaced at a different distance from the ends of the torque tube/adapter than the predetermined distances between complementary features. For example, FIGS. 17a and 17b illustrates that the complementary features, e.g., slots 220, may be spaced at a predetermined distance d1 from each other. This distance d1 is greater than the distance d2 of the endmost slot 220 to the end 222 of the torque tube 102. FIG. 20a also illustrates this from a plan view. Furthermore, the two complementary features adjacent to the two ends of the torque tube/adapter may be spaced at different distances from their respective ends, and these different distances may each be different from the spacing between complementary features.

Figure 13A:
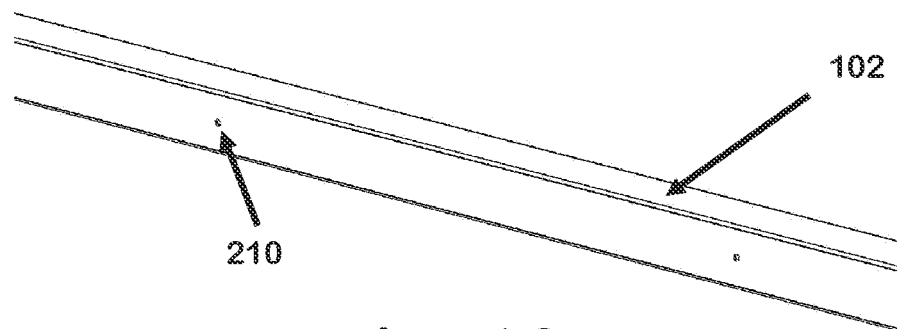
FIGS. 13a-d show torque tubes with different positioning and/or securing features to position and/or secure the module clips.
Figure 13B:
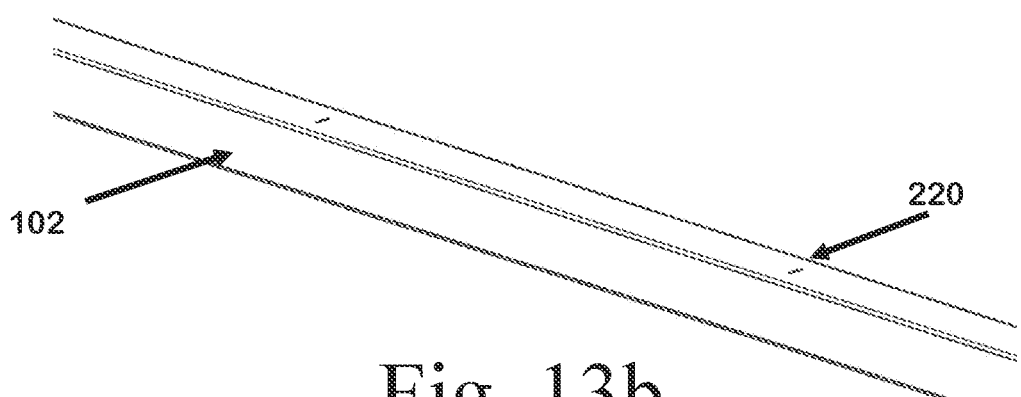
Figure 13C:
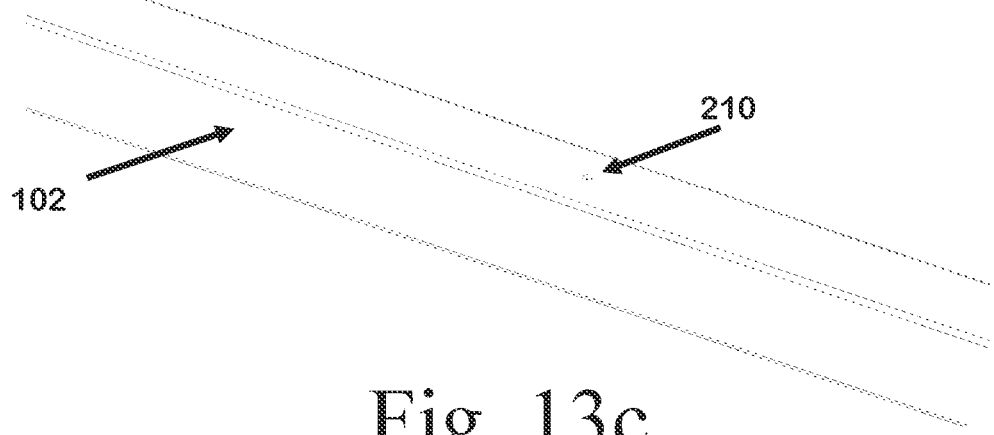
Figure 13D:
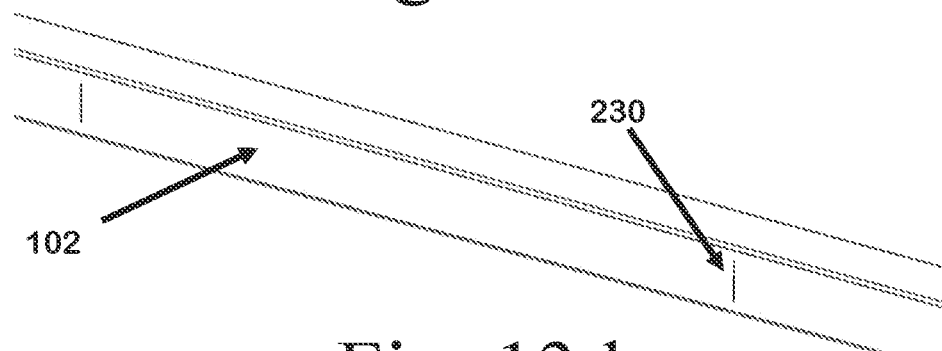
Figure 14A:
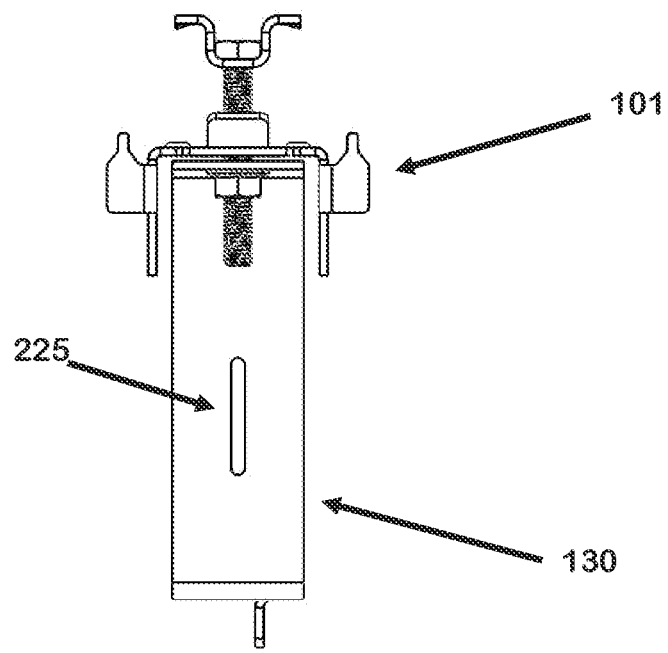
FIG. 14a shows a side view of a solar module clip with a sight guide on the tube strap to position the solar module clip onto a torque tube.
Figure 14B:
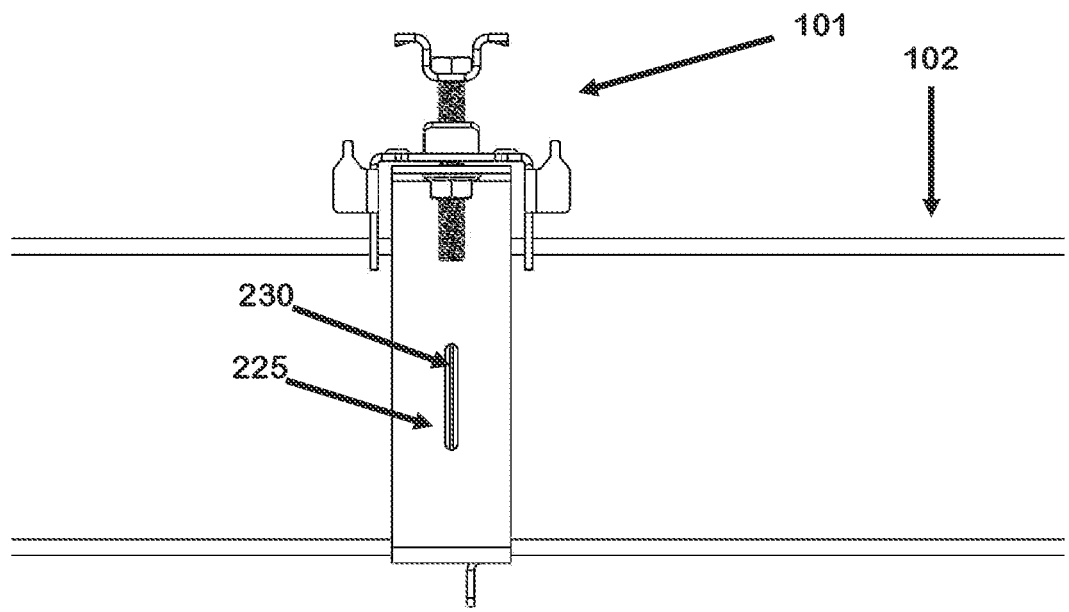
FIG. 14b shows a side view of the solar module clip secured onto the torque tube and positioned at the sight mark on the torque tube.

Complementary features on module clips and torque tube/adapters may also include sight guides and sight marks, as shown in FIGS. 13d, 14a, and 14b. In an example, the module clip has sight guides 225 placed on the opposing sides of the tube strap as shown in FIGS. 14a and 14b. A sight guide may be a hole or slit puncturing the entire material of the region in which it is located, so that the other side of the material is visible through the hole or slit. Correspondingly, sight marks 230 are placed on the opposing side surfaces of the torque tube as shown in FIGS. 13d and 14b. When the tube strap of the module clip is placed around the torque tube/adapter, the sight mark is visible through the sight guide when the module clip is positioned in the correct place. The sight guide and sight mark allow easy spacing of module clips and the solar modules upon them. Alternatively or additionally, the sight guides may be on the top or bottom of the module clip rather than on the sides, for example on the lower rails of the module clip. In this case, the sight marks may be on the top or bottom surfaces of the torque tube/adapter rather than on the sides.

Examples of adapters suitable for relocating the module clips will now be described.

Figure 15A:
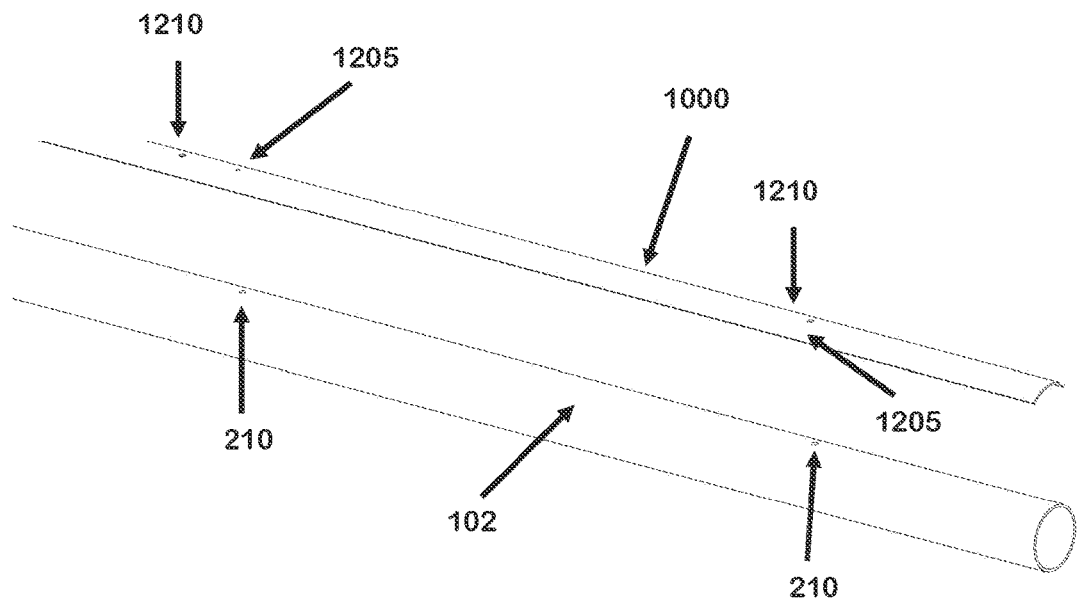
FIGS. 15a and 15b show a perspective view of an adapter to be positioned onto a torque tube and relocate the holes on the torque tube.
Figure 15B:
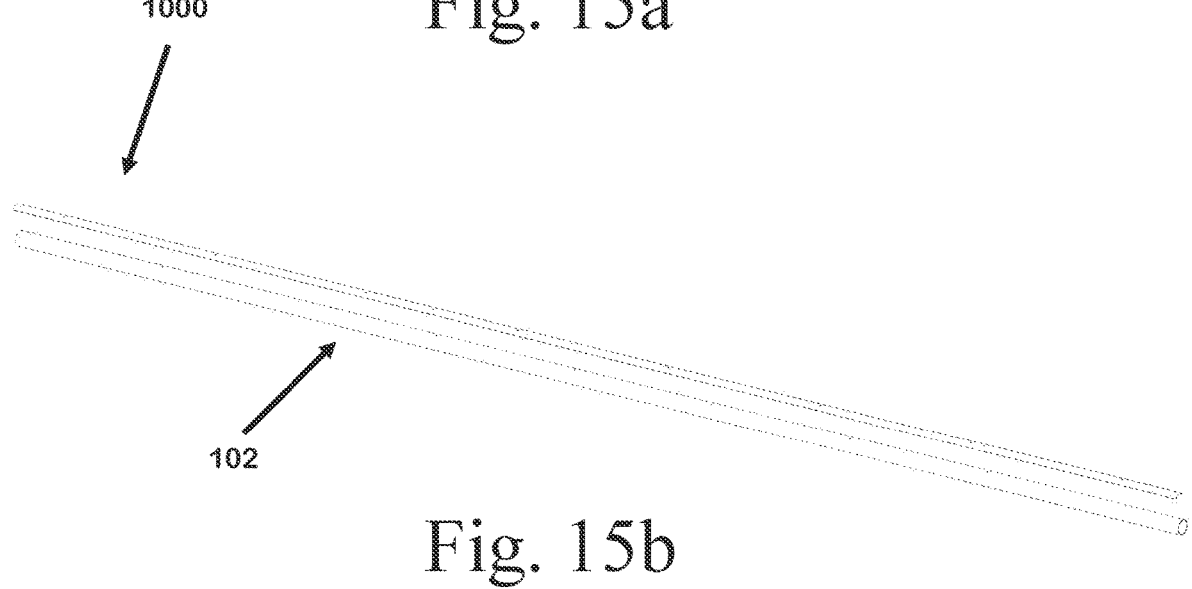
Figure 16A:
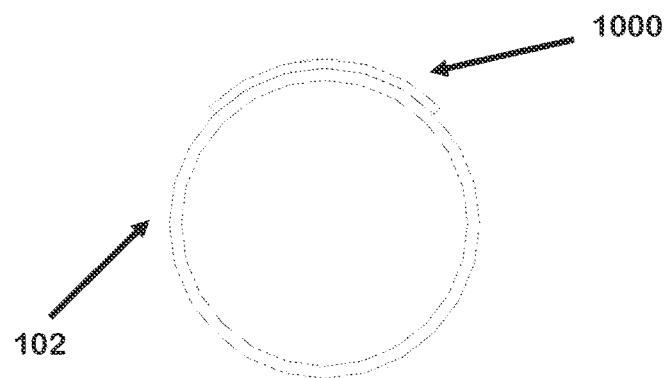
FIGS. 16a, 16b, and 16c show an adapter secured onto the torque tube to relocate the holes on the torque tube.
Figure 19A:
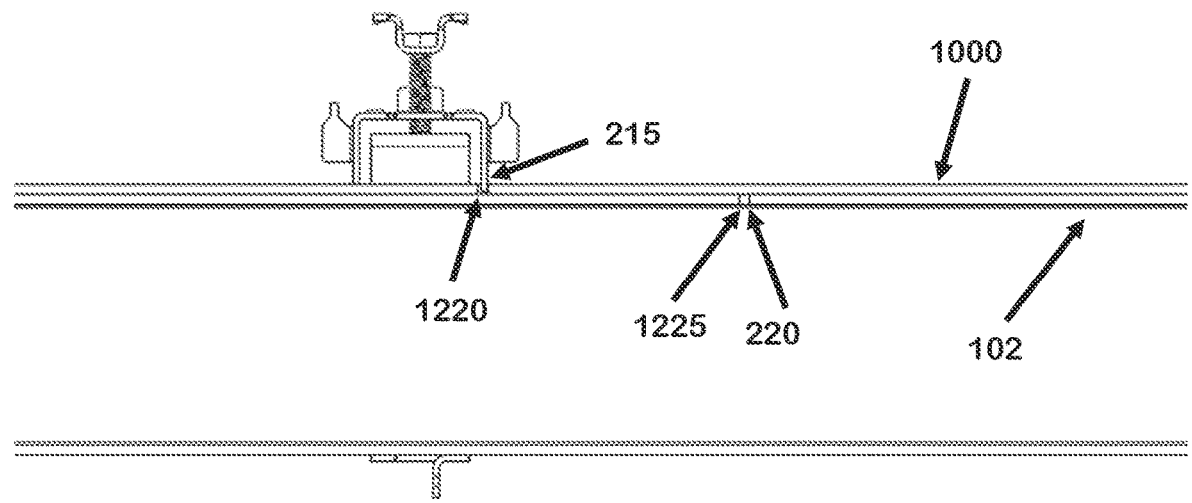
FIGS. 19a and 19b show cross sections of module clips clipped onto adapters secured onto the torque tube.

FIGS. 15a and 15b show an exploded view of a round torque tube and an adapter above the torque tube. The adapter 1000 may be shaped to conform to the top surface of the torque tube 102. Since this embodiment of the torque tube is round, the adapter may be curved. A cross section of the adapter taken in the North-South direction may conform to at least a portion of the cross-sectional shape of the torque tube (e.g., in FIG. 16a, illustrating a curved adapter conforming to a top portion of the circular torque tube). The adapter "relocates" the torque tube complementary features. In this example the complementary features are holes, but any description in this example may be applied to any other complementary feature even when only one specific feature is being described. In embodiments of the invention, the adapter does this by having a complementary feature, in this case a dimple, on the bottom surface of the adapter. Alternatively, the adapter may have an attachment feature that is not a complementary feature attaching the adapter to the torque tube. The bottom surface of the adapter is concave in this example. FIGS. 15a and 15b show the adapter dimple 1205 for ease of understanding, even though the dimple would not usually be visible from the perspective shown. The dimples 1205 in the adapter may be spaced apart from each other the same distance as the holes 210 on the torque tube are spaced apart from each other. The dimple fits 1205 into the original hole 210 on the torque tube 102 in the same way that a dimple 205 on a module clip would fit into that hole. This secures the adapter to the torque tube. Once the adapter is secured on the torque tube, it is ready to receive the module clips. On the convex top surface, the adapter has relocation holes 1210. The relocation holes serve a same or similar function as the as the holes on the torque tube, in that dimples on module clips can be fitted into them for positioning and retaining purposes. They may even be identical in shape, although this is not a requirement. The relocation hole may penetrate the entire thickness of the adapter, as shown in FIG. 19a, or it may penetrate only a partial thickness of the adapter, e.g. penetrating the top surface of the adapter without penetrating the bottom surface of the adapter. These relocated positioning features may have the same dimensions or share some of the same dimensions as the original positioning features. For example, the adapter relocation holes 1210 may have a same or substantially the same diameter as the original holes 210, while having a different or same height or thickness. The relocated positioning features may have a same shape and/or volume as the original positioning features they are designed to replace, although this is not a requirement.

The relocation holes 1210 are spaced apart from each other on the top surface of adapter 1000 at a different distance than the original holes 210 on the torque tube 102. Optionally, at least one of the holes closest to the ends of the adapter may be at a same position as an original hole on the torque tube. That is, the first relocation hole 1210 adjacent to one end of the adapter may be spaced a same distance from the end of the torque tube/adapter as the distance that the original hole 210 is spaced from the end of the torque tube. In that case, the adapter dimple 1205 may be aligned with the relocation hole 1210 so that both of them are at the same position on the adapter. In any case, the relocation holes 1210 may be spaced apart at a smaller distance from each other or a larger distance from each other than the spacing that original holes 210 have from each other.

Figure 16B:
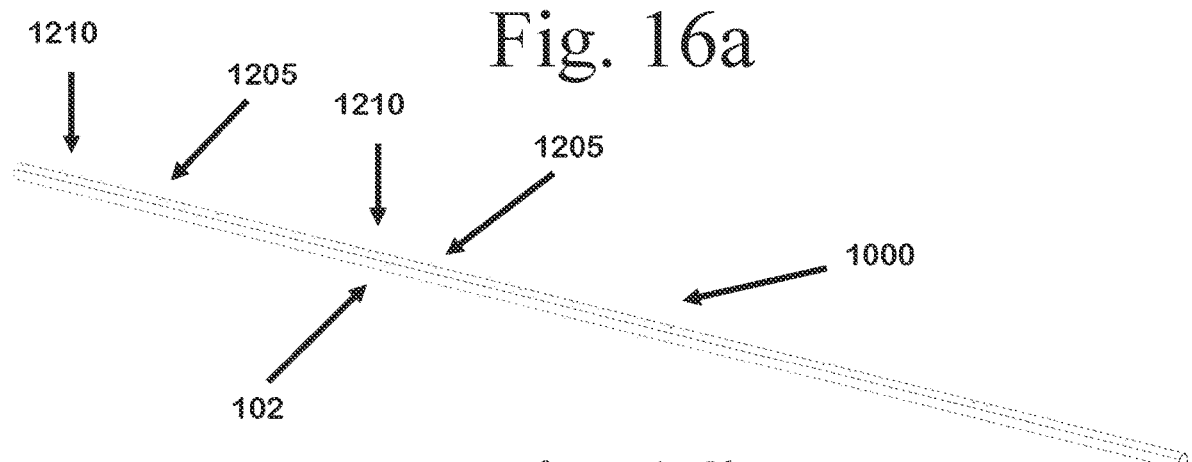
Figure 16C:
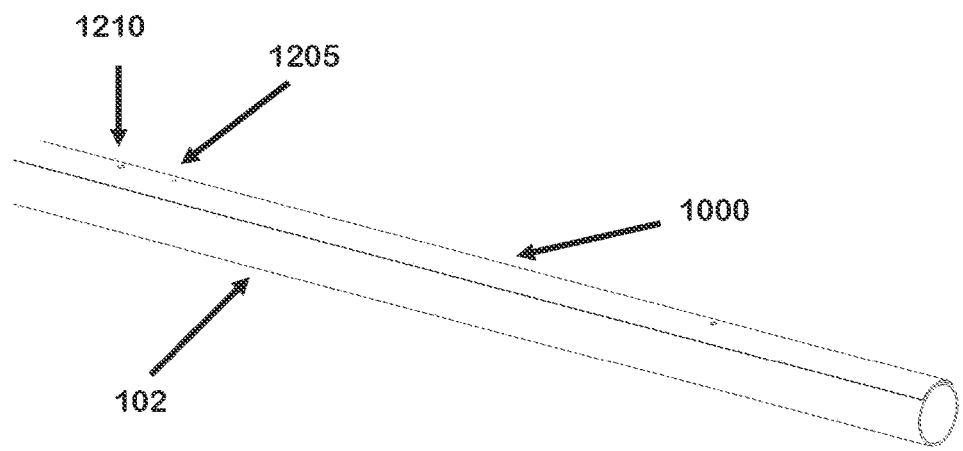

FIGS. 16a, 16b, and 16c show the adapter 1000 secured to the torque tube 102, with FIG. 16a showing the cross section (e.g., taken from the North-South direction). The module clips can be clipped onto the adapter and torque tube combination once the adapter is secured onto the torque tube. The dimples 205 in the module clip will fit into the relocated holes on the secured adapter, so that the module clips will be spaced apart at a different distance than they would be if they were clipped into the original holes of the torque tube. Thus the solar modules clipped into the relocated module clips may have a different width than when clipped into module clips positioned in the original holes.

The adapter 1000 may have a same length as the length of the torque tube 102 (e.g., in the North-South direction) but this is not a requirement. The adapter may be shorter or longer than the length of the torque tube. The adapter may be a single continuous piece for its entire length, e.g., a single continuous piece of the same length as the torque tube. Since the adapter may not surround the entire surface of the torque tube (as shown in FIG. 16a), the attached adapter may only cover a surface area that is a portion of the torque tube's outer surface area, such as for example 15-25% of the torque tube's outer surface area, e.g., 20%. For example, the adapter may only cover at least a portion of the top surface of the torque tube, without covering side surfaces nor a bottom surface of the torque tube (as shown in FIG. 18a).

The adapter may be a rigid material matching the material of the torque tube. The adapter may alternatively be a different material from the torque tube. The adapter material may be metal.

FIGS. 17a and 17b show a similar adapter and torque tube combination as FIGS. 15a and 15b described above, except the torque tube is square, the adapter is flat, and the complementary features are slots and positioning tabs. Descriptions of same or similar characteristics may be omitted for conciseness. Like the hole and dimple embodiment, the adapter 1000 here may have relocated slots 1220 on the top surface and positioning tabs (not illustrated) on the bottom surface facing the torque tube 102. Alternatively, the adapter has a flat bottom surface facing the torque tube 102 and may be positioned on the torque tube by aligning the ends of the adapter with the ends of the torque tube. In any case, the torque tube's top surface facing the adapter has slots 220 corresponding to the bottom surface positioning tabs of the adapter. The slots on the adapter are spaced at a different distance from each other compared to the slots on the torque tube. FIGS. 18a, 18b, and 18c show the adapter secured to the torque tube such that the adapter positioning tabs are inserted into the torque tube slots, with FIG. 18a showing the cross section (e.g. taken from the North-South direction).

Figure 18A:
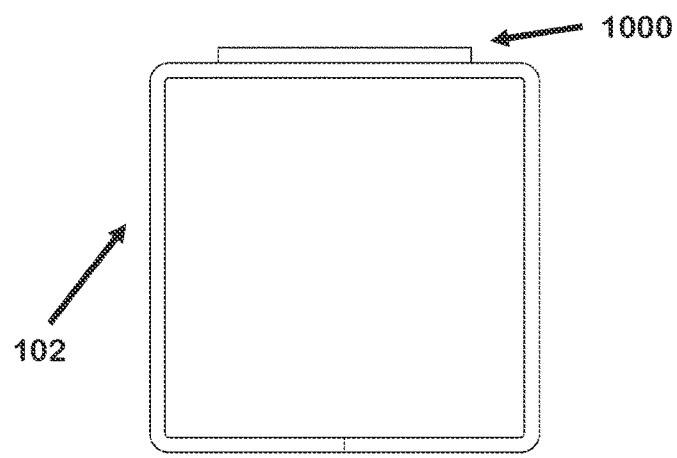
FIGS. 18a, 18b, and 18c show an adapter secured onto the torque tube to relocate the holes on the torque tube.
Figure 18B:
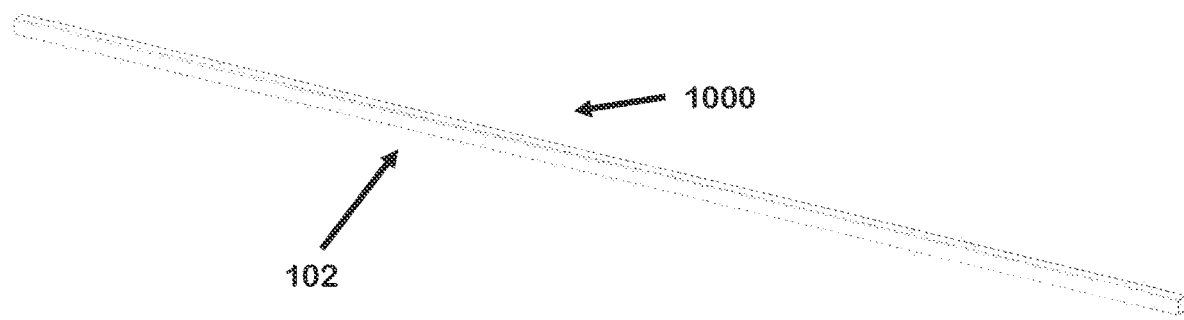
Figure 18C:
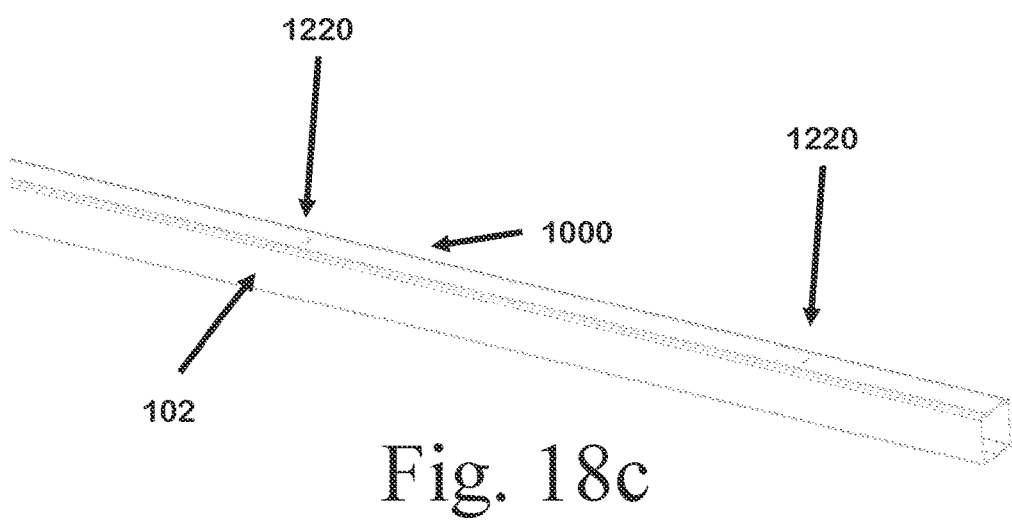

As seen in FIG. 18a, the adapter may have a width (e.g. in the East-West direction) less than a width of the top surface of the torque tube. However, this is not a requirement, and the adapter may have a same width or greater width than that of the top surface.

Figure 19B:
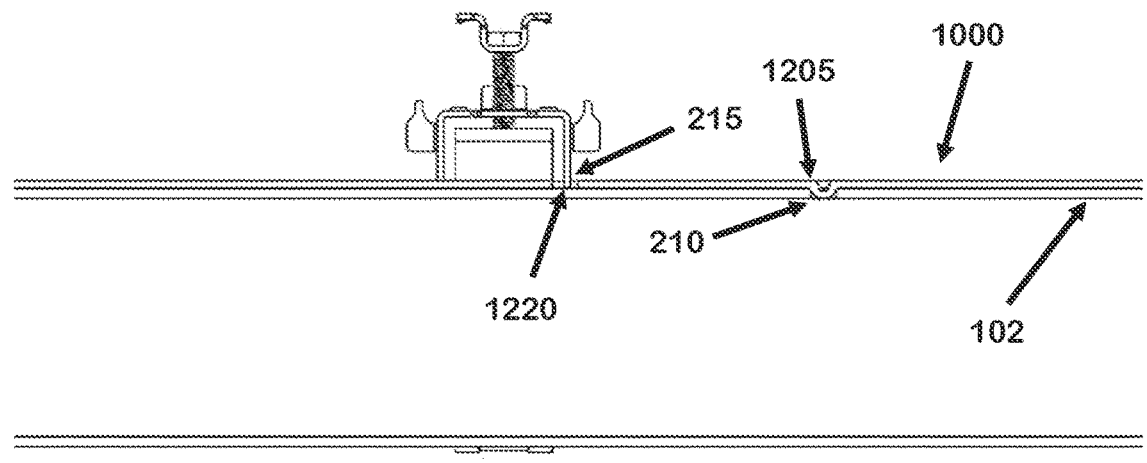

FIGS. 19a and 19b show cross-sections (e.g., taken from the East-West direction) of the secured adapter 1000, the underlying torque tube 102, and the clipped in module clip. The cross-sections apply equally to a round or square torque tube. FIG. 19a shows a positioning tab 215 on the module clip, a relocated slot 1220 and an adapter positioning tab on the bottom surface of the adapter, and a slot 220 on the torque tube 102. FIG. 19b shows that the complementary features can be mixed and matched. The module clip here has the positioning tab 215, the adapter has a relocated slot 1220 and an adapter dimple 1205 on the bottom surface of the adapter, and the torque tube 102 has a hole 210 corresponding to a position of the adapter dimple 1205. In this way the adapter not only relocates the complementary feature of the torque tube, which is a hole 210, but adapts the hole 210 to a relocated slot 1220. Since the module clip in this example uses a positioning tab 215 mismatched with the torque tube hole 210, the adapter's use of a relocated slot 1220 on its top surface allows the module clip to be clipped in properly. This adapter allows the torque tube to be used with module clips that would otherwise be mismatched with the torque tube's complementary features.

Figure 20B:
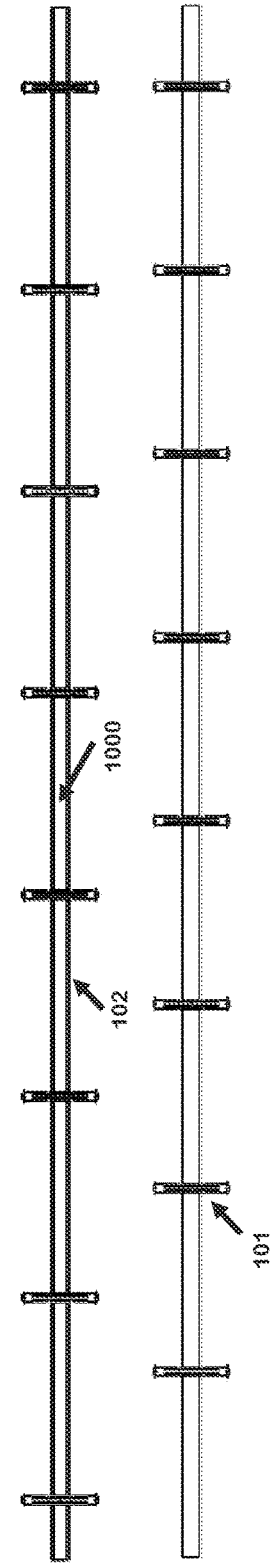
Figure 20C:
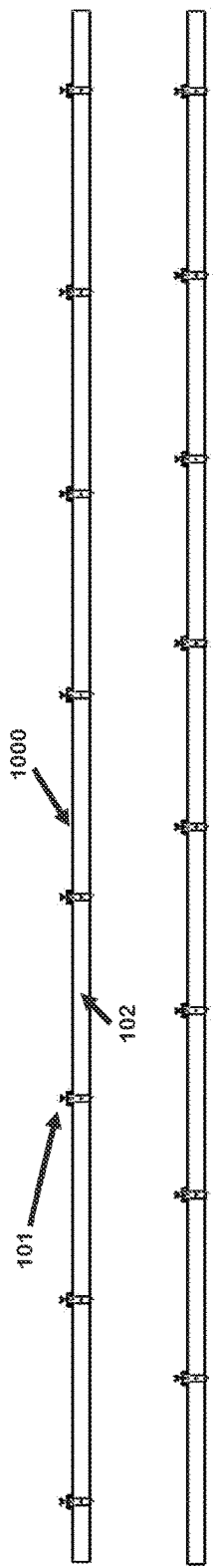

FIG. 20a shows a plan view, respectively, of a top surface of a torque tube 102 with original holes 210, an adapter 1000 with relocated holes 1210, and the adapter 1000 deployed on the torque tube 102. FIG. 20b shows a plan view of, respectively, the modules 101 clipped onto the top surface of the torque tube 102, and the modules clipped on the torque tube 102 and deployed adapter 1000. FIG. 20c shows a side view of, respectively, the modules 101 clipped on the torque tube 102, and the modules 101 clipped on the torque tube 102 and the deployed adapter 1000. The first relocated hole 1210/complementary feature on the adapter (starting from the right of the page) is at the same position as the original hole 210/complementary feature on the torque tube. In other words, the first relocated hole is spaced apart from the closest end of the adapter at the same distance d1 as the first original hole in the torque tube is spaced apart from the closest end of the torque tube. The predetermined distance d3 between relocated holes, however, is different from the predetermined distance d2 between original holes. As a result, the last relocated hole on the other end of the adapter (at the left of the page) is at a different position than the leftmost original hole in the torque tube. Each of the predetermined distance d3 and d2 are greater than the distance d1. This may be because the distance d1 between the first hole and the end of the torque tube is not designed to accommodate a solar panel module, while the distances d2 and d3 are designed to accommodate solar panel modules. Once the adapter is secured on the torque tube, only the relocated holes are visible and accessible; the original holes may no longer be accessible to the module clips.

Alternatively, the first relocated hole 1210 on the adapter may be spaced at a different distance from the closest end of the adapter compared to the first original hole on the torque tube.

Figure 21A:
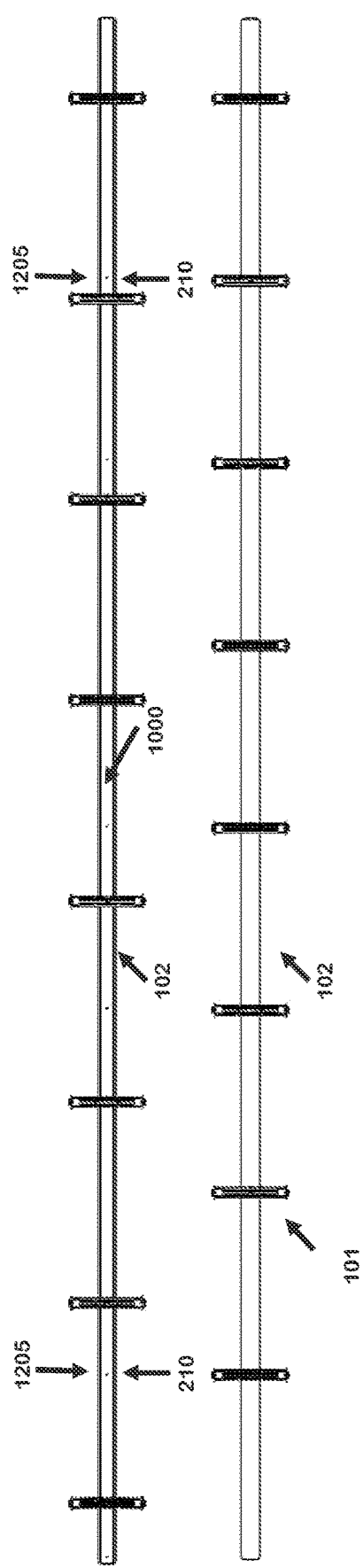
FIGS. 21a and 21b show top views of positioning features on adapters as well as complementary features on adapters securing the adapters to torque tubes.
Figure 21B:
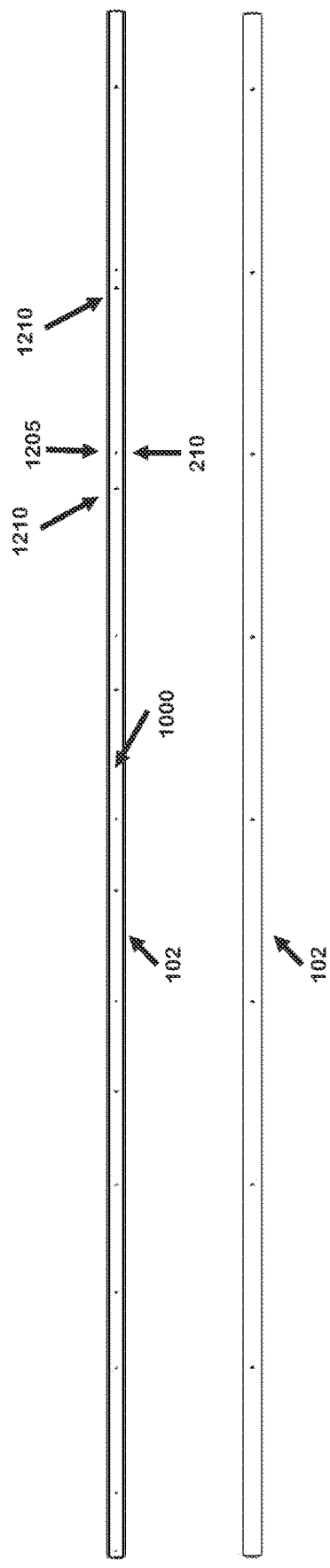

FIG. 21a shows a plan view of, respectively, module clips 101 clipped onto the torque tube 102 and adapter 1000, and module clips 101 clipped onto a torque tube 102 without the adapter 1000. FIG. 21b shows a plan view of, respectively, the torque tube 102 and adapter 1000 without the module clips 101, and the torque tube 102 without the adapter 1000 nor the module clips 101. For ease of understanding, FIGS. 21a and 21b illustrates positions of the original holes 210/complementary features on the torque tube which match the positions of the dimples 1205 on the adapter 1000, both of which usually might not be visible due to being on the bottom surface of the adapter. In embodiments of the invention, the dimples 1205 or other complementary features on the bottom surface of the adapter 1000 may be visible, for example, if the dimple 1205 is a stamped feature on the bottom surface of the adapter that shows up as a protrusion on the top surface of the adapter.

The adapter may be employed as a number of segmented adapters used for a single torque tube. Each segmented adapter may have two complementary features. For example, a segmented adapter may have one complementary feature on the bottom surface to secure the adapter to the torque tube's complementary feature, and another complementary feature on the segmented adapter's top surface to relocate the torque tube's complementary feature for the module clip. There may be one segmented adapter for each complementary feature on the torque tube, and one relocated feature on the top surface of every segmented adapter. For example, FIGS. 22a-22d show that the torque tube 102 has holes 210, the segmented adapter 1500 has dimples 1205 on the bottom surface corresponding to the torque tube holes 210, and the top surface of the adapter has relocated holes 1210 offset from the dimples 1205 and torque tube holes 210. The dimples 1205 on the bottom concave surface of the segmented adapter (i.e., the inner surface of the segmented adapter facing the torque tube) is illustrated for the sake of understanding, even though the dimples 1205 may not usually be visible from the perspectives shown. Alternatively, a single segmented adapter may cover and/or be secured to multiple complementary features on the torque tube, and/or multiple relocated features may be present on the top surface of a single segmented adapter. For example, a single segmented adapter may cover multiple complementary features on the torque tube while only have a single complementary feature on the bottom surface of the adapter secured in a single complementary feature of the torque tube. In other words, more or less segmented adapters may be placed on the torque tube depending on if the new solar module length or width in the North-South direction is lesser or greater than the original solar module length or width in the North-South direction.

Each segmented adapter may be a continuous piece in and of itself, but may be a separate piece with the other segmented adapters on the torque tube. Each segmented adapter may be spaced out from the other adapters on the torque tube so that none of them are in direct contact with each other. However, this is not a requirement, and the segmented adapters may be in direct contact with each other on the torque tube even though they are separate pieces. The segmented adapter may be made of or include a rigid material, such as metal.

Figure 22C:
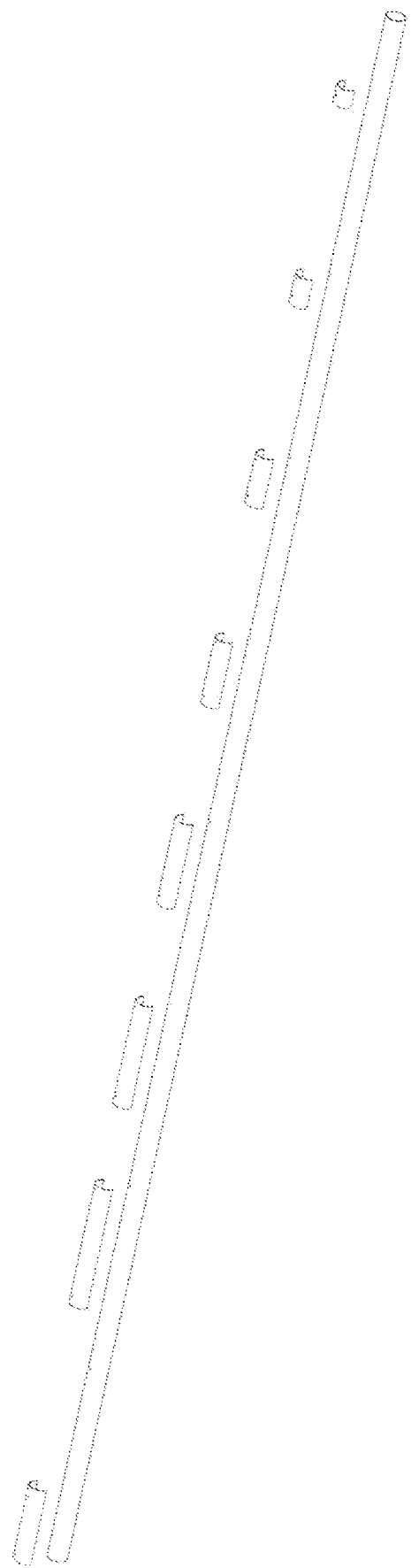
Figure 22D:
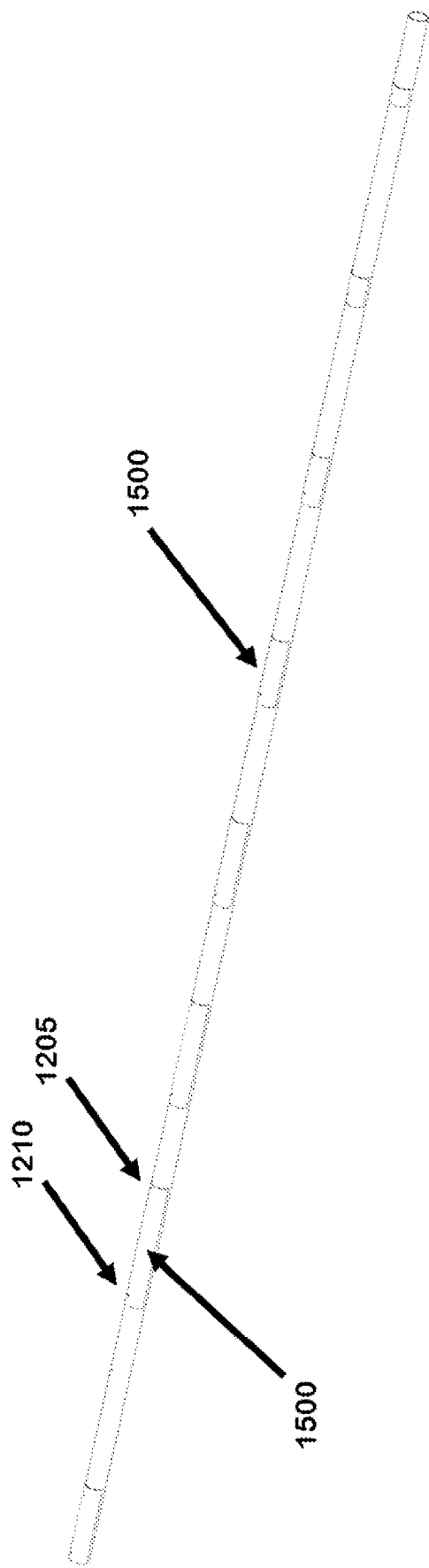

When the segmented adapters are secured on the torque tube, the relocated features are spaced apart from each other at distances different from the spacing between the original complementary features on the torque tube. As a result of this different spacing, each segmented adapter may have a top surface relocated feature spaced at a different distance from the bottom surface complementary feature compared to other segmented adapters. For example, FIGS. 22a-d show that the distance between relocated hole 1210 and adapter dimple 1205 is different for each segmented adapter 1500. Each segmented adapter 1500 may have a different length from each other as a result of this difference. For example, the segmented adapters from one end of the torque tube may get progressively longer as they reach the other end of the torque tube, as shown in FIG. 22a moving from the right hand side of the torque tube to the left hand side. If the segmented adapters have different lengths from each other, then they may also be spaced at unequal distances to each other due to the length differences. For example, the spacing between segmented adapters may get progressively smaller from one end of the torque tube to the other, as shown in FIG. 22a moving from the right hand side of the torque tube to the left hand side. Alternatively, every segmented adapter on a single torque tube may have the same length.

Figure 23A:
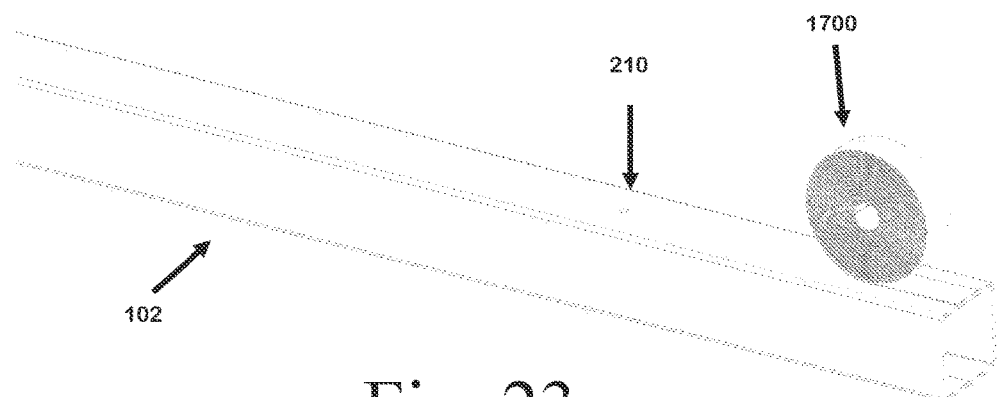
FIGS. 23a-c show a rollable adapter made of a bendable material being deployed onto a torque tube.
Figure 23B:
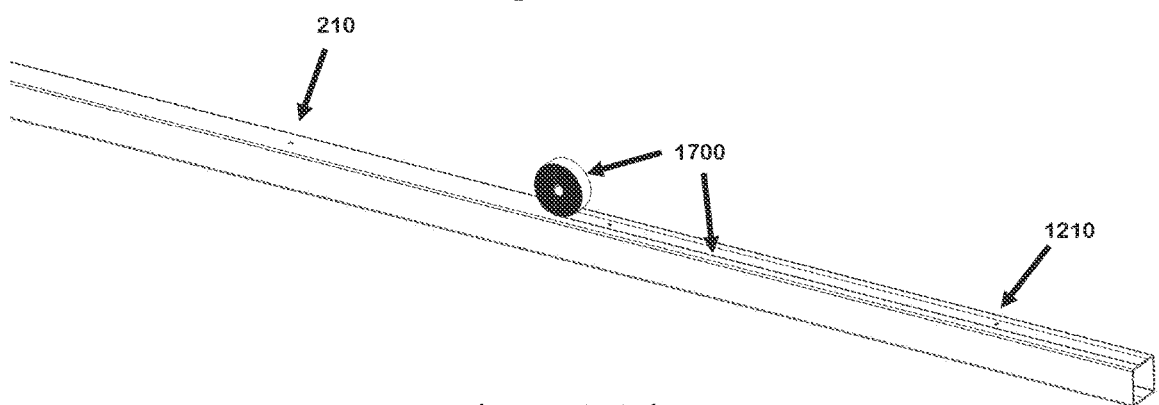
Figure 23C:
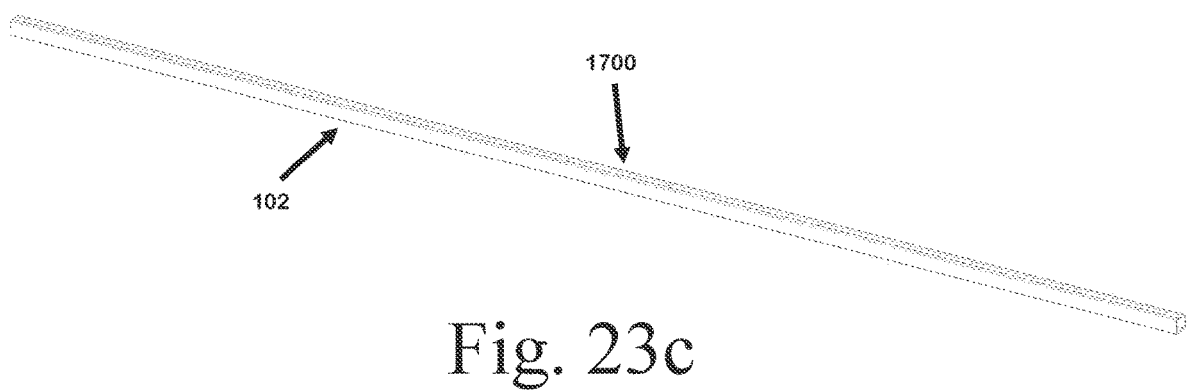

Instead of using a rigid material, the adapter may be employed as a pliable, bendable, and/or rollable material, such as a thin metal. Before deployment, the rollable adapter 1700 may be rolled up like a roll of tape, to be compact and easily transportable as shown in FIG. 23a. The rollable adapter 1700 in its rolled form may have less than 1/10th the length in the horizontal direction than when it is in its unrolled form, e.g., less than 1/20th the length in the horizontal direction. To deploy the rollable adapter 1700, it is unrolled on the desired surface of the torque tube 102. The features on this rollable adapter may otherwise be similar to the rigid adapters described above. For example, the rollable adapter may have a corresponding complementary feature (e.g., a dimple) that allows it to be secured to the torque tube via the torque tube's complementary feature (e.g., a hole 210). The corresponding complementary feature is on a surface that faces the torque tube when the rollable adapter is unrolled, i.e., the bottom surface of the adapter when deployed onto the torque tube. The bottom surface of the adapter when it is deployed corresponds to the outer-facing surface of the adapter when it is rolled up (i.e., the surfaces facing away from the center of the rolled-up adapter). Thus, when the adapter is rolled-up, the corresponding complementary feature may be on the outer-facing surfaces of the rolled-up adapter. The relocated feature, e.g. relocated hole 1210, may be on the inner-facing surfaces of the rolled-up adapter (facing the center of the rolled-up adapter), which are the top surface of the secured adapter after it is unrolled. That is, the two types of complementary features on the adapter may be on opposing surfaces of the adapter. Alternatively, the rollable adapter may not have any complementary features on the bottom surface, which may instead be completely flat when rolled over the torque tube.

When unrolled, the rollable 1700 adapter may match the entire length of the torque tube, however this is not a requirement. The unrolled adapter may be longer or shorter than the torque tube. The rollable adapter may have a width smaller than a width of the torque tube surface it is deployed on, in the same way as the rigid adapter shown in FIG. 18*a*. Alternatively, the rollable adapter may have a same or greater width than the torque tube surface it is deployed on. The unrolled adapter may be one continuous piece when deployed on a torque tube, or it may be segmented when deployed on the torque tube in all the same ways as the segmented adapter described above.

The module clips may be relocated using a removable jig as an adapter. The length of removable jig may be equal to a relocation distance between module clips. The relocation distance may be different from the original distance between module clips when they are positioned on the original complementary features of the torque tube, if the torque tube has original complementary features. The relocation distance can be greater than or lesser than the original distance. The removable jig may be used by placing the jig flush against a surface of the torque tube. The removable jig may be secured onto the torque tube, for example by being loosely clamping it onto the torque tube, or it may be merely placed against it, for example by resting the jig on a top surface of the torque tube or manually holding it against a side surface of the torque tube without clamping. A length of the removable jig may be parallel to a length of the torque tube in the North-South direction. The removable jig may first be positioned on the torque tube using a reference point. The reference point may be an original complementary on the torque tube, such as a hole. The reference point r1 may alternatively be a module clip 101 already secured onto the torque tube 102. For example, the module clip may be positioned and secured at a first hole on the torque tube to serve as a reference point. This reference point module clip may use the original hole on the torque tube even though the other module clips must be relocated to positions different from the original holes. Since it is only the different dimensions of solar panels between module clips which demands different spacing between module clips, the initial position of the first module clip may stay the same. Alternatively, the removable jig may use one end of the torque tube as a reference point instead.

The first end of the removable jig is placed in direct contact with or directly adjacent to the reference point. For example, if the reference point r1 is a first module clip 101 strapped to the torque tube 102, the first end of the removable jig 1900 is placed up against and in direct contact with the tube strap of the module clip. The second end of the removable jig naturally spaces out a relocated distance d4 for a second module clip to be positioned on the torque tube. The relocated module clip may be positioned on the torque tube by placing it in direct contact with the second end of the removable jig. That is, the length of the removable jig may match the relocated spacing d4 between module clips as measured from the module clip tube straps.

The initial module clip serving as a reference point may have a complementary feature such as a dimple to be secured into the original hole on the torque tube, while the other module clips positioned by the removable jig may not have any complementary features. These other module clips may be positioned by the jig onto relocated locations of the torque tube that lack any holes, so they do not necessarily need any dimples or any other complementary features. In an embodiment, none of the module clips secured onto the torque tube have any complementary features, and the initial module clip is positioned on the torque tube without any complementary feature on the torque tube. Alternatively, all of the module clips secured onto the torque tube have complementary features to secure them onto the torque tube.

Once the second module clip 101 has been positioned by the removable jig with the first module clip as reference point, the jig is removed from the torque tube. Then, with the second module clip as a reference point, the first end of the removable jig is placed against the second module clip. A third module clip is placed at the second end of the removable jig, to be spaced out the same distance from the second module clip as the second module clip is spaced out against the first module clip. This process is successively repeated until the torque tube runs out of room for module clips. For example, the removable jig may overshoot an end of the torque tube, or the distance between the end of the torque tube and an end of the removable jig may be less than the length of the module clip tube strap in the North-South direction.

Figure 25A:
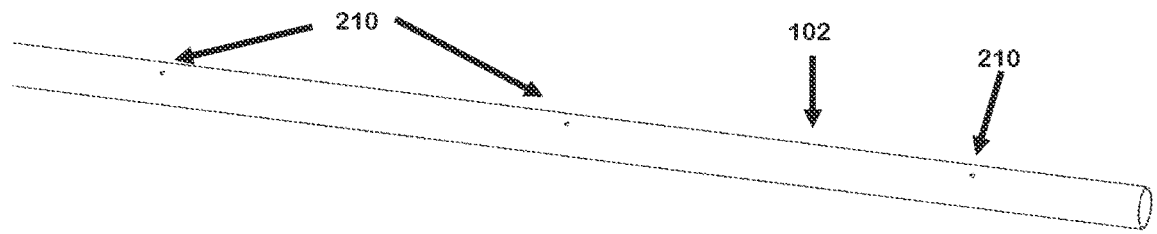
FIGS. 25a-e show a removable jig being used to position and/or relocate module clips onto a torque tube.
Figure 25B:
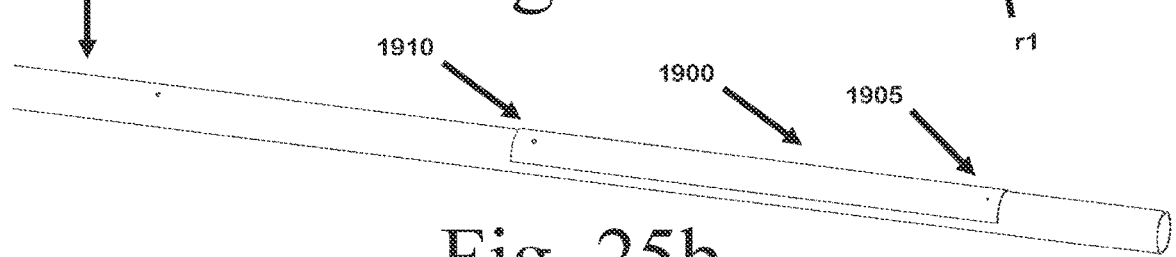
Figure 25C:
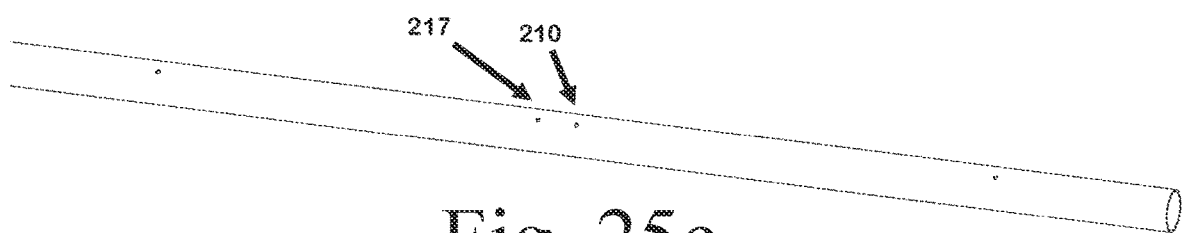
Figure 25D:
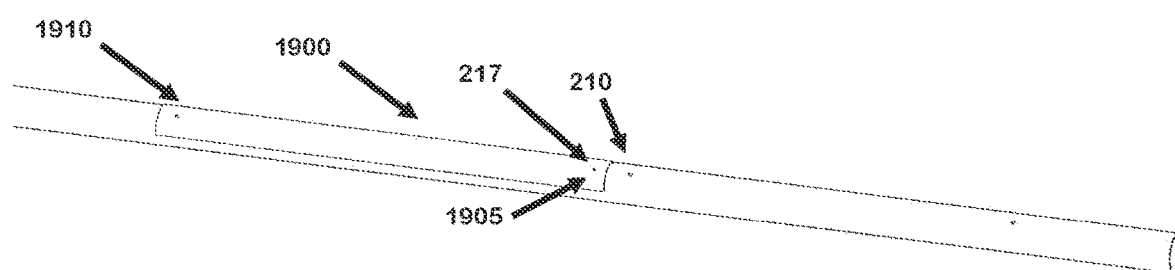
Figure 25E:
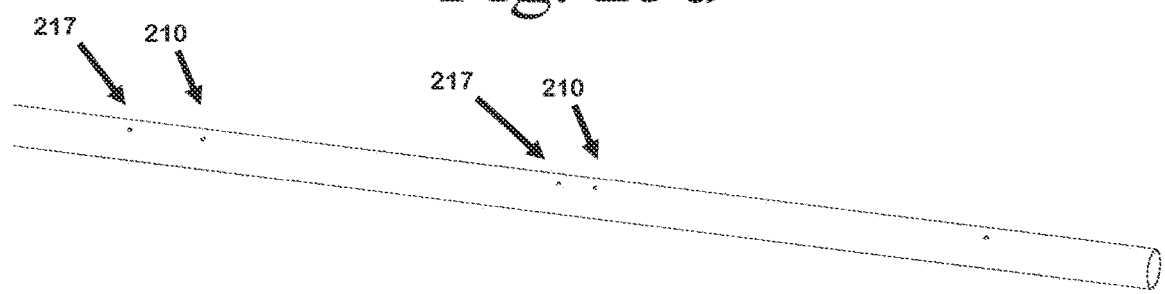
Figure 26A:
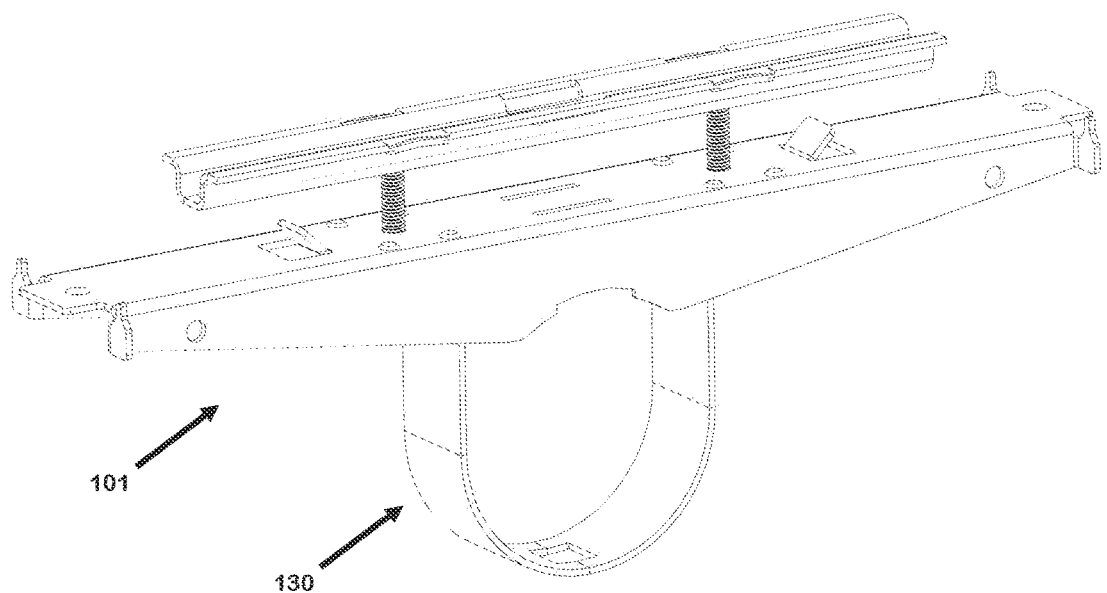
FIGS. 26a and 26b show a module clip with a clamping cutout to position and secure the module clip on a particular type of adapter.
Figure 26B:
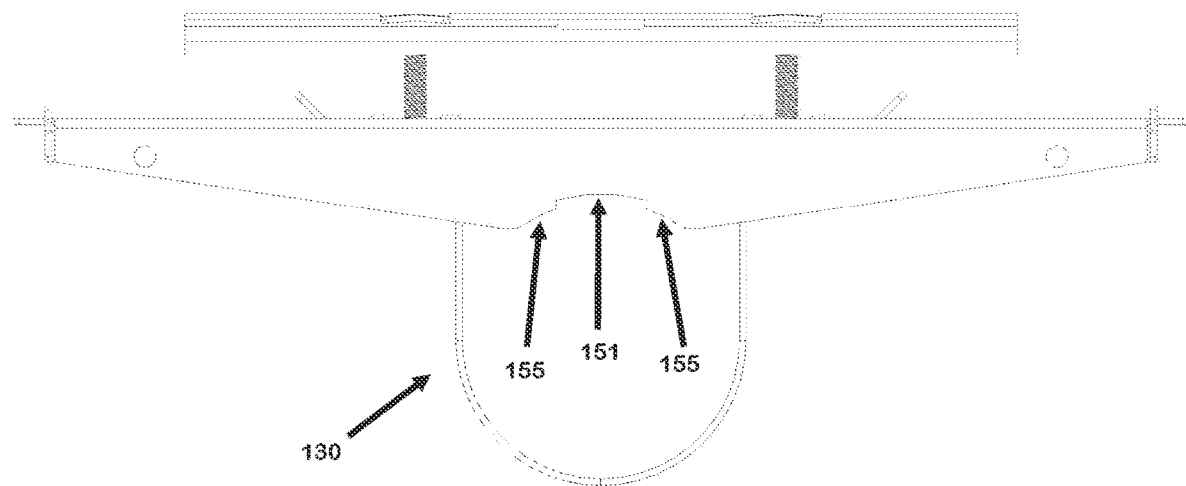
Figure 27A:
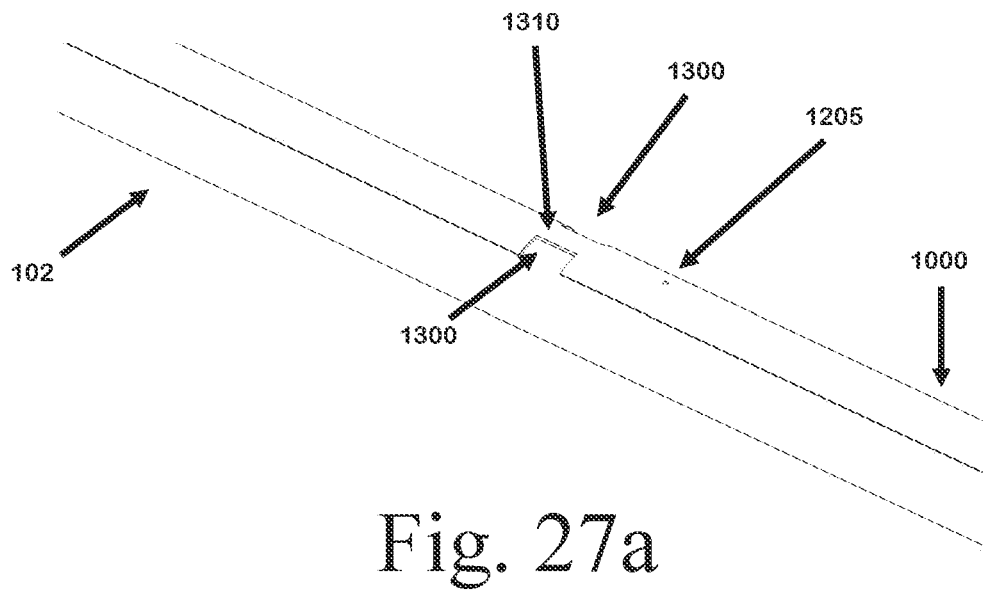
FIGS. 27a-c show an adapter on a torque tube with cutouts forming a clamping region as a positioning and securing feature, and the module clip clamped onto the clamping region of the adapter.
Figure 27B:
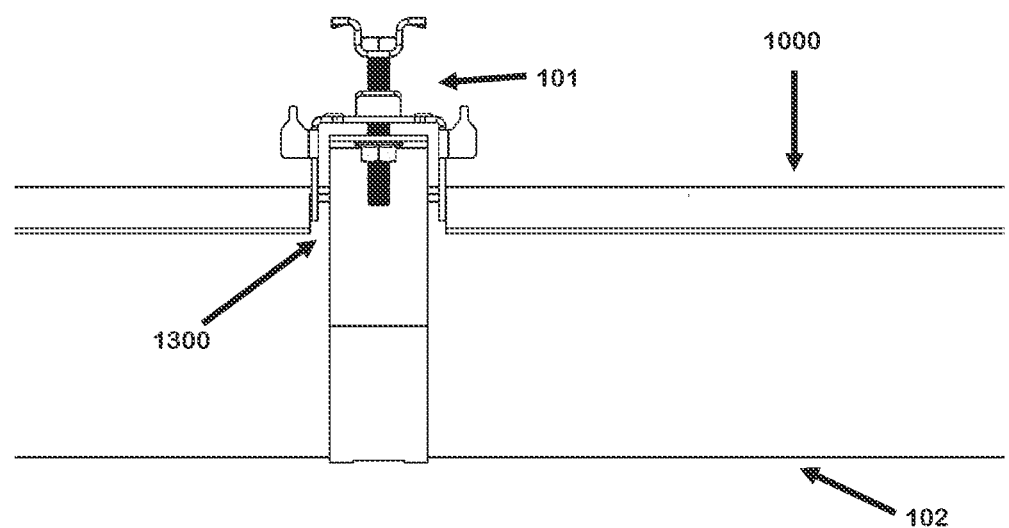
Figure 27C:
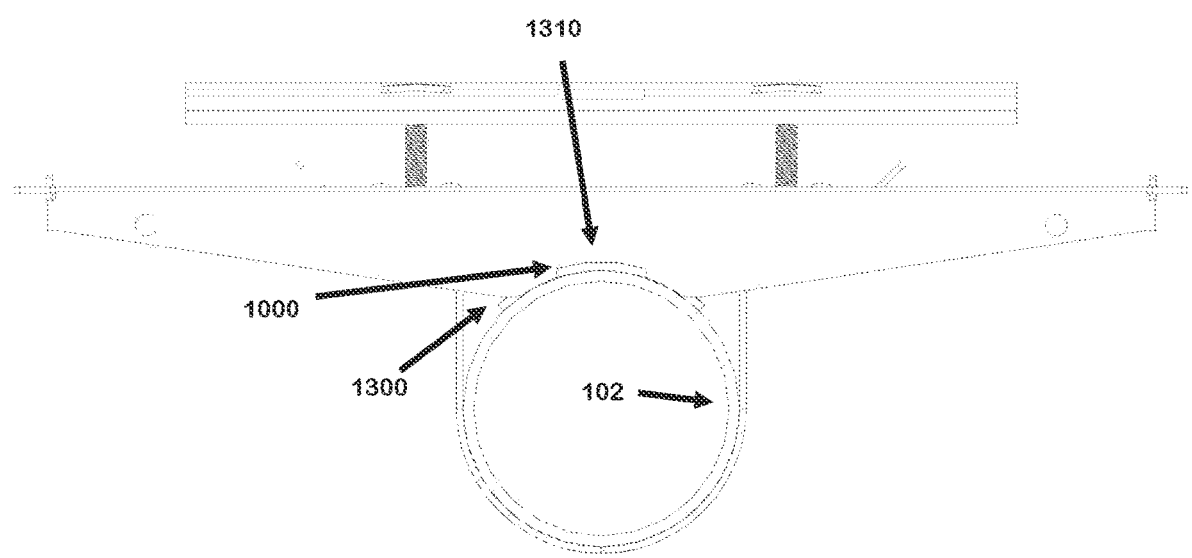

If the reference point is instead an original complementary feature on the torque tube, such as a hole, the removable jig may be used to place relocated complementary features onto the torque tube. The relocated complementary features may be any of the complementary features described in this specification. For example, new holes may be drilled into the torque tube. This process is shown in FIGS. 25*a-e*. FIG. 25*a* shows the original torque tube 102 with the original holes 210. In FIG. 25*b*, the removable jig 1900 with a jig dimple 1905 near a first end of the removable jig is secured into the original hole 210 (i.e., reference r1) on the torque tube, and a torque tube relocated hole 217 is drilled into the torque tube at the second end of the removable jig. The relocated hole 217 is drilled through the jig hole 1910 that is spaced apart from the jig dimple 1905 for that purpose. The jig hole 1910 is spaced apart from the jig dimple 1905 greater or lesser than a distance between the original holes 210. The removable jig is removed from the torque tube, leaving the relocated hole 217 spaced apart from the original hole 210. Then, the removable jig 1900 is secured into the relocated hole 217, and another torque tube relocated hole 217 is drilled through the jig hole 1910. The first end of the removable jig is placed against the relocated hole, and another relocated hole is drilled into the torque tube at the second end of the removable jig. This continues until space runs out on the torque tube. Alternatively, relocated sight marks may be placed on the torque tube instead of relocated holes, or any other of the aforementioned complementary features.

Alternatively, multiple removable jigs may be used to simultaneously position multiple module clips and/or drill relocated holes by spacing them out against each other, or a single removable jig may be used to position all module clips and/or relocated holes on a torque tube simultaneously.

Figure 24A:
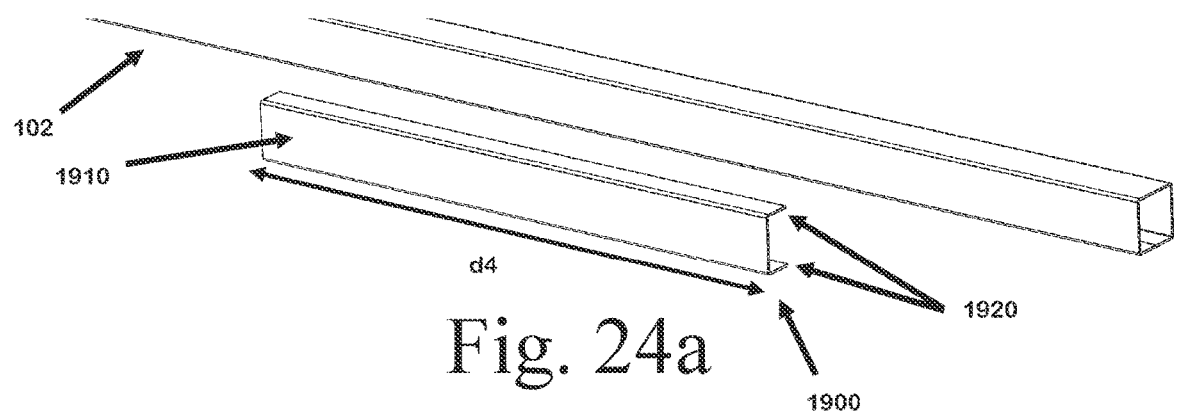
FIGS. 24a-d show a removable jig being used to position and/or relocate module clips onto a torque tube.
Figure 24B:
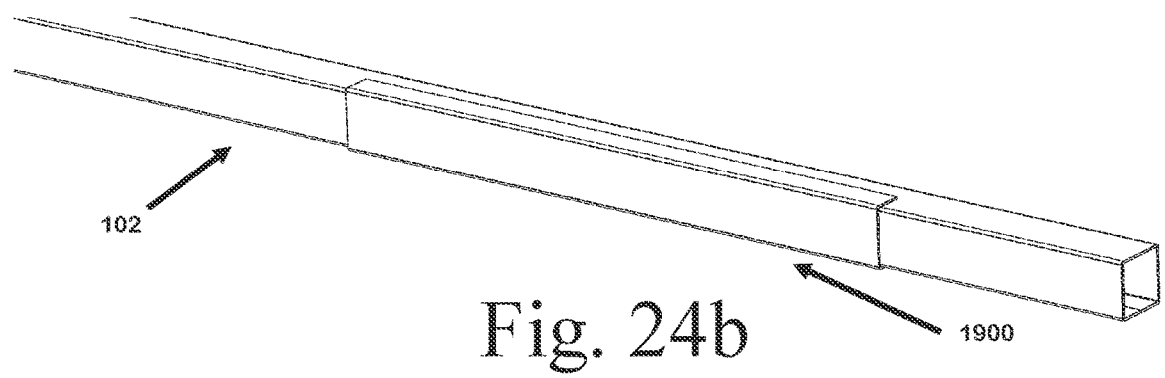
Figure 24C:
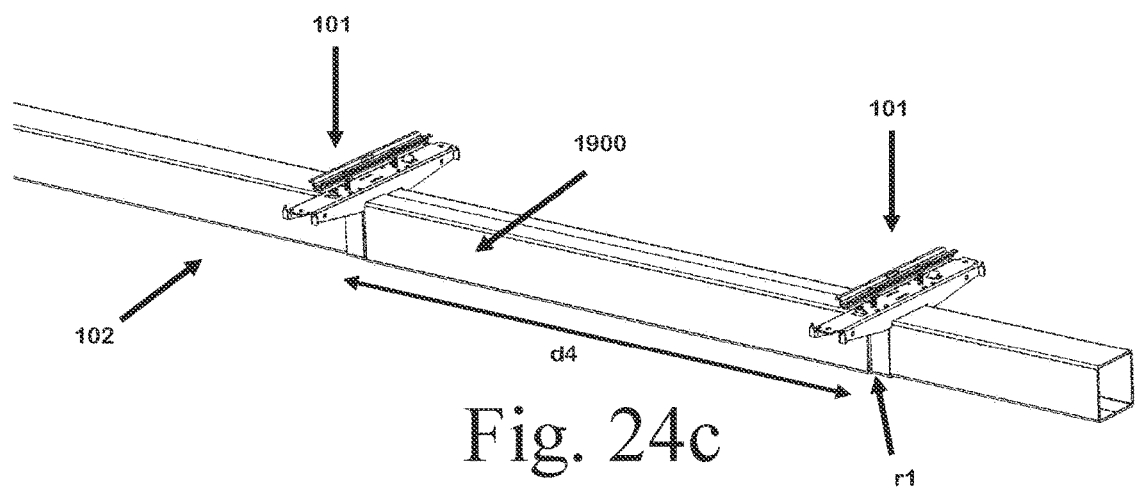
Figure 24D:
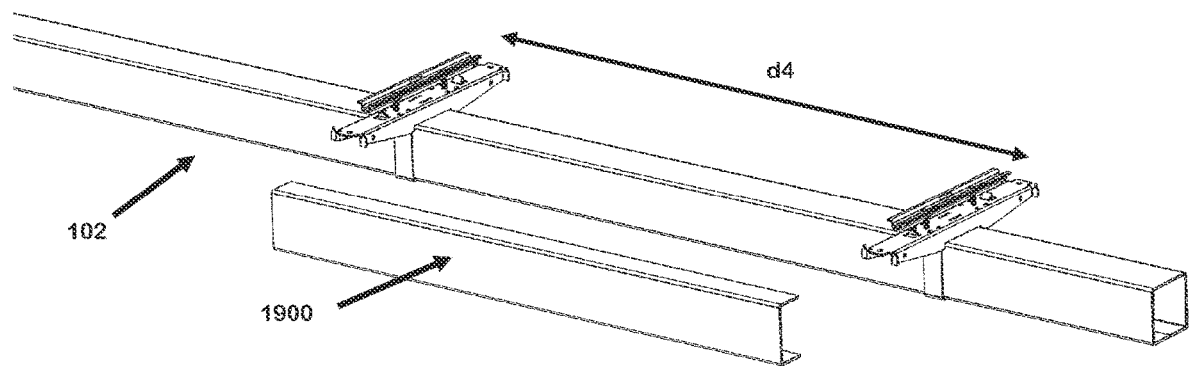

The removable jig 1900 may be a three-sided structure as shown in FIGS. 24*a-d*. A first side 1910 may have the same or substantially same height as the height of the torque tube, measured in a third direction perpendicular to both the North-South and East-West direction. The other two sides 1920 may extend perpendicular to this first side to be parallel with each other. These sides 1920 allow the removable jig to clamp to the torque tube during the relocation process. The removable jig may clamp mainly to a side of the torque tube, as shown in FIG. 24c, and/or to a top or bottom of the torque tube. The shape of the removable jig is not so limited, and may be any shape capable of spacing out the module clips. For example, the removable jig may be curved to fit over a round torque tube, or it may be completely flat without surfaces extending at different angles to each other. When placed on the torque tube, the removable jig may have a length in the North-South direction equal to or less than a width of the solar module in the North-South direction. The removable jig may be made of a rigid material and made of metal, or it may be made of a nonmetal.

Instead of a hole, dimple, tab or slot on its top surface, the adapter 1000 may utilize cutouts 1300 at the edges of the adapter 1000, as shown in FIGS. 26a-b and 27a-c. These cutouts 1300 function in a similar way as the other aforementioned complementary features, in that they relocate and secure the module clips. The adapter cutouts 1300 may be made on opposing edges of the adapter and aligned with each other in the East-West direction. The cutouts may form a clamping region 1310 between them. The module clips here may not have a hole, dimple, tab or slot. Instead, the module clips 101 may have a clamping cutout 151 designed to fit around and/or clamp around the clamping region. The edges 155 of the module clip surrounding the clamping cutout 151 may be inserted within the adapter cutouts to be contained or bounded by the adapter cutouts. These edges 155 may be in direct contact with the adapter cutouts 1300 so that they are constrained by the adapter cutouts 1300 from moving. In this way the module clip 101 is secured in its relocated position. These cutouts in the torque tube and clamping cutout in the module clip may otherwise have the same or similar characteristics as the other complementary features on these devices described above, including positioning and spacing on the devices.

FIG. 32 shows an example of a solar panel array control system 500 coupled to a solar panel array. The solar panel array control system 500 may communicate with the solar panel array.

The solar panel array may include one or more solar panel groups 510 each including one or more solar panel modules 100. The groups 510 may include one or more solar panels connected in series, in parallel, or any combination thereof. The solar panel groups may include rows of solar panels, and may be trackers 300 as described above. Any description herein of rows of solar panels may apply to any other type of arrangement or grouping of solar panels.

Optionally, each group of solar panels may each have (e.g., be coupled to and in communication with) a group control system 504. Each group control system 504 may control operation their respective solar panel group 510. The group control systems 504 may be referred to as row controllers when controlling rows of solar panels. Any number of solar panel groups and/or group control systems may be provided. Each group may comprise any number of solar panels. Each group may have the same number of solar panels or differing numbers of solar panels. A central controller 502 may optionally be provided that may control the group control systems.

The solar panel array control system 500 may comprise the central controller 502 and, optionally, one or more group control systems 504. In some instances, one-way communication may be provided from the central controller to the one or more group control systems. The central controller may send instructions to the one or more group control systems, which may in turn control operation of the corresponding solar panel groups. In some instances, two-way communication may be provided between the central controller and the one or more group control systems. For instance, the group control systems may be group controllers that may send data to the central controller. The central controller may send instructions to the group controllers, for example in response to, or based on, the data received from the group controllers. The data from the one or more group controllers may optionally include data from one or more solar panels, or various types of sensors physically included as part of the solar panel group (e.g., on a torque tube, foundation, bearing assembly, or other part of the tracker), physically remote from the solar panel group, and/or otherwise physically or electrically coupled to the solar panel group.

The solar panel array control system may affect operation of the solar panels, which may include positioning of the solar panels. The control system may affect an orientation of the solar panel. The control system may control amount of rotation, rate of rotation, and/or acceleration of rotation of one or more solar panels. The control system may affect a spatial disposition of the solar panel. The control system may control an amount of translation, speed of translation, and/or acceleration of translation of one or more solar panels. The control system may affect operation of one or more driving mechanisms for a solar panel array, for example the slew drive coupled to one or each of the solar panel groups. The solar panels may be positioned in response to one or more factors, as previously described herein. The solar panel array control system may affect other operations of the solar panels, such as turning the solar panels on or off, operational parameters of converting the solar energy to electrical energy, diagnostics, error detection, calibration, or any other type of operations of the solar panels.

In one example, a method of optimizing power generation throughout a field of trackers may be provided. Operational data for each grouping (e.g., each row) of solar panels may be provided. Any description herein of a row may apply to any grouping. The method may include collecting row-level operational data in aggregate, or piecemeal, to determine the operational characteristics of one or more rows of trackers. Power generation data of each row may be measured to determine if shading is occurring from one row to the next. The method may include analyzing total field power generation to determine if shading specific rows, while further optimizing or adjusting the tilt of other rows for generating power, will increase overall field power generation.

Row-level tests may be performed to determine the impact of shading of one or more rows on the one or more neighboring rows with regard to power generation of the neighboring rows. Row-level tests may be performed on one or more rows to determine if an optimum orientation assumption yields optimum or increased power generation. Tracking schedules may be updated to optimize or increase power generation throughout a tracker field or for each individual row. Row-level power generation may be monitored and compared with weather station reports to determine if sun-tracking operations or non-sun-tracking operations will yield greater power generation. Based on the comparison, an operation may be selected to yield the greater power generation.

This disclosure is illustrative and not limiting. Further modifications will be apparent to one skilled in the art in light of this disclosure and are intended to fall within the scope of the appended claims.

The invention claimed is:

1. A solar tracker, comprising:
a solar module support having a first length extending in a horizontal direction and comprising positioning features arranged along the first length, the positioning features spaced apart at a first distance from each other;
an adapter disposed on the solar module support to have a second length parallel to the first length of the solar module support and to cover more than one of the positioning features, the adapter comprising a first surface facing the solar module support and a second surface opposite the first surface, the second surface comprising relocated positioning features spaced apart from each other at a second distance in the horizontal direction different than the first distance; and
a module clip comprising a complementary clip feature securing the module clip to a relocated positioning feature of the relocated positioning features of the adapter,
wherein the adapter entirely covers more than one of the positioning features of the solar module support in a vertical direction perpendicular to the horizontal direction.

2. The solar tracker of claim 1, wherein the first surface comprises first complementary features spaced apart from each other at a substantially same distance as the first distance and securing the adapter to the solar module support.

3. The solar tracker of claim 1, wherein the adapter comprises segmented adapters each comprising at least one of the relocated positioning features, the segmented adapters matching the positioning features on the solar module support.

4. The solar tracker of claim 3, wherein the segmented adapters each comprise a first complementary feature on the first surface securing the segmented adapter to the solar module support.

5. The solar tracker of claim 3, wherein the segmented adapters have different lengths from each other in the horizontal direction.

6. The solar tracker of claim 5, wherein the adapter comprises a bendable material.

7. The solar tracker of claim 1, wherein:
the adapter comprises two parallel edges extending along the first length of the solar module support in the horizontal direction, and the relocated positioning features on the adapter comprises cutouts each formed on one of the two parallel edges, each of the cutouts formed on one of the two parallel edges is aligned with another of the cutouts formed on the other of the two parallel edges to form a clamping region between them, and
the module clip comprises a clamping cutout and securing the module clip to the adapter comprises clamping the clamping cutout around the clamping region of the adapter.

8. The solar tracker of claim 1, where none of the relocated positioning features on the adapter matches a horizontal position of any of the positioning features.

9. The solar tracker of claim 1, wherein the solar module support has a round cross-section and the adapter is curved.

10. The solar tracker of claim 1, wherein the solar module support has a square cross-section and the adapter is not curved.

11. The solar tracker of claim 1, wherein the complementary clip feature on the module clip is a dimple, the positioning features on the solar module support are holes, and the relocated positioning features on the adapter are holes.

12. The solar tracker of claim 1, wherein the complementary clip feature on the module clip is a tab, the positioning features on the solar module support are slots, and the relocated positioning features on the adapter are slots.

13. The solar tracker of claim 1, wherein the complementary clip feature on the module clip is a sight guide, the positioning features on the solar module support are sight marks, and the relocated positioning features on the adapter are sight marks.

14. The solar tracker of claim 1, wherein the relocated positioning features extend through from the first surface of the adapter to the second surface of the adapter.

15. The solar tracker of claim 1, wherein the module clip has a third length extending in a second horizontal direction perpendicular to the first horizontal direction.

16. The solar tracker of claim 1, wherein the adapter comprises first complementary features spaced apart from each other in the horizontal direction, and aligned with and disposed in the positioning features of the solar module support.

17. A solar tracker, comprising:
a solar module support having a first length extending in a horizontal direction and comprising positioning features arranged along the first length, the positioning features spaced apart at a first distance from each other;
an adapter disposed on the solar module support to have a second length parallel to the first length of the solar module support and to cover more than one of the positioning features, the adapter comprising a first surface facing the solar module support and a second surface opposite the first surface, the second surface comprising relocated positioning features spaced apart from each other at a second distance in the horizontal direction different than the first distance; and
a module clip comprising a complementary clip feature securing the module clip to a relocated positioning feature of the relocated positioning features of the adapter,
wherein only one of the relocated positioning features on the adapter matches a horizontal position of one of the positioning features.

18. A solar tracker, comprising:
a solar module support having a first length extending in a horizontal direction and comprising positioning features arranged along the first length, the positioning features spaced apart at a first distance from each other;
an adapter disposed on the solar module support to have a second length parallel to the first length of the solar module support and to cover more than one of the positioning features, the adapter comprising a first surface facing the solar module support and a second surface opposite the first surface, the second surface comprising relocated positioning features spaced apart from each other at a second distance in the horizontal direction different than the first distance; and
a module clip comprising a complementary clip feature securing the module clip to a relocated positioning feature of the relocated positioning features of the adapter,
wherein the relocated positioning features are a same shape as the positioning features.

19. The solar tracker of claim 18, wherein the relocated positioning features are a same size as the positioning features.

* * * * *